US011436591B2

(12) United States Patent
Swanson et al.

(10) Patent No.: US 11,436,591 B2
(45) Date of Patent: Sep. 6, 2022

(54) STORED-VALUE INSTRUMENT PURCHASE FUNCTIONALITY FOR ONLINE SHOPPING SYSTEMS

(71) Applicant: Ibotta, Denver, CO (US)

(72) Inventors: Luke Swanson, Denver, CO (US); Ron White, Arvada, CO (US); Garrett Floyd, Lone Tree, CO (US)

(73) Assignee: Ibotta, Denver, CO (US)

( * ) Notice: Subject to any disclaimer, the term of this patent is extended or adjusted under 35 U.S.C. 154(b) by 0 days.

(21) Appl. No.: 16/845,588

(22) Filed: Apr. 10, 2020

(65) Prior Publication Data

US 2020/0327534 A1    Oct. 15, 2020

Related U.S. Application Data

(60) Provisional application No. 62/832,484, filed on Apr. 11, 2019.

(51) Int. Cl.

| G06Q 30/00 | (2012.01) |
| G06Q 20/34 | (2012.01) |
| G06N 20/00 | (2019.01) |
| G06Q 30/06 | (2012.01) |
| G06Q 20/20 | (2012.01) |

(52) U.S. Cl.
CPC ........... *G06Q 20/342* (2013.01); *G06N 20/00* (2019.01); *G06Q 30/0635* (2013.01); *G06Q 30/0641* (2013.01); *G06Q 20/207* (2013.01)

(58) Field of Classification Search
None
See application file for complete search history.

(56) References Cited

U.S. PATENT DOCUMENTS

| 10,510,219 B1* | 12/2019 | Zalewski | ............. G07G 1/0072 |
| 2005/0144093 A1* | 6/2005 | Kassan | ............. G06Q 30/0641 |
| | | | 705/26.3 |
| 2007/0299732 A1* | 12/2007 | Gluzberg | ............... G06Q 30/06 |
| | | | 705/26.81 |

(Continued)

OTHER PUBLICATIONS

Gerald L. Lohse et al. "Electronic Shopping" Communications of the ACM Jul. 1998/vol. 41, No. 7, pp. 81-88 (Year: 1998).*

*Primary Examiner* — Naeem U Haq
(74) *Attorney, Agent, or Firm* — Adsero IP

(57) ABSTRACT

Novel tools and techniques are provided for implementing stored-value instrument purchase functionality for online shopping systems. In various embodiments, a computing system might assess content and/or information presented in a checkout page of a retailer website, the checkout page listing items selected by a user for purchase and a total purchase amount. The computing system might autonomously modify the checkout page by generating a user-selectable option therewithin, the user-selectable option comprising an option to purchase the items using a gift card available for purchase from a service provider. In response to selection of the user-selectable option, the computing system might provide a purchase interface that presents the user with a process to purchase a gift card having a gift card value. After completing purchase of the gift card, the computing system might apply the gift card value toward the total purchase amount within the checkout page.

18 Claims, 28 Drawing Sheets

(56) References Cited

U.S. PATENT DOCUMENTS

| | | | |
|---|---|---|---|
| 2009/0063295 A1* | 3/2009 | Smith | G06Q 30/0603 |
| | | | 705/26.2 |
| 2009/0254447 A1* | 10/2009 | Blades | G06Q 30/0601 |
| | | | 705/26.1 |
| 2009/0287579 A1* | 11/2009 | Walker | G06Q 20/18 |
| | | | 705/21 |
| 2010/0010918 A1* | 1/2010 | Hunt | G06Q 30/0643 |
| | | | 705/26.1 |
| 2014/0064694 A1* | 3/2014 | Zealer | G06F 3/14 |
| | | | 386/230 |
| 2014/0249916 A1* | 9/2014 | Verhaeghe | G06Q 30/0633 |
| | | | 705/14.51 |
| 2019/0281030 A1* | 9/2019 | Isaacson | G06Q 20/40 |

\* cited by examiner

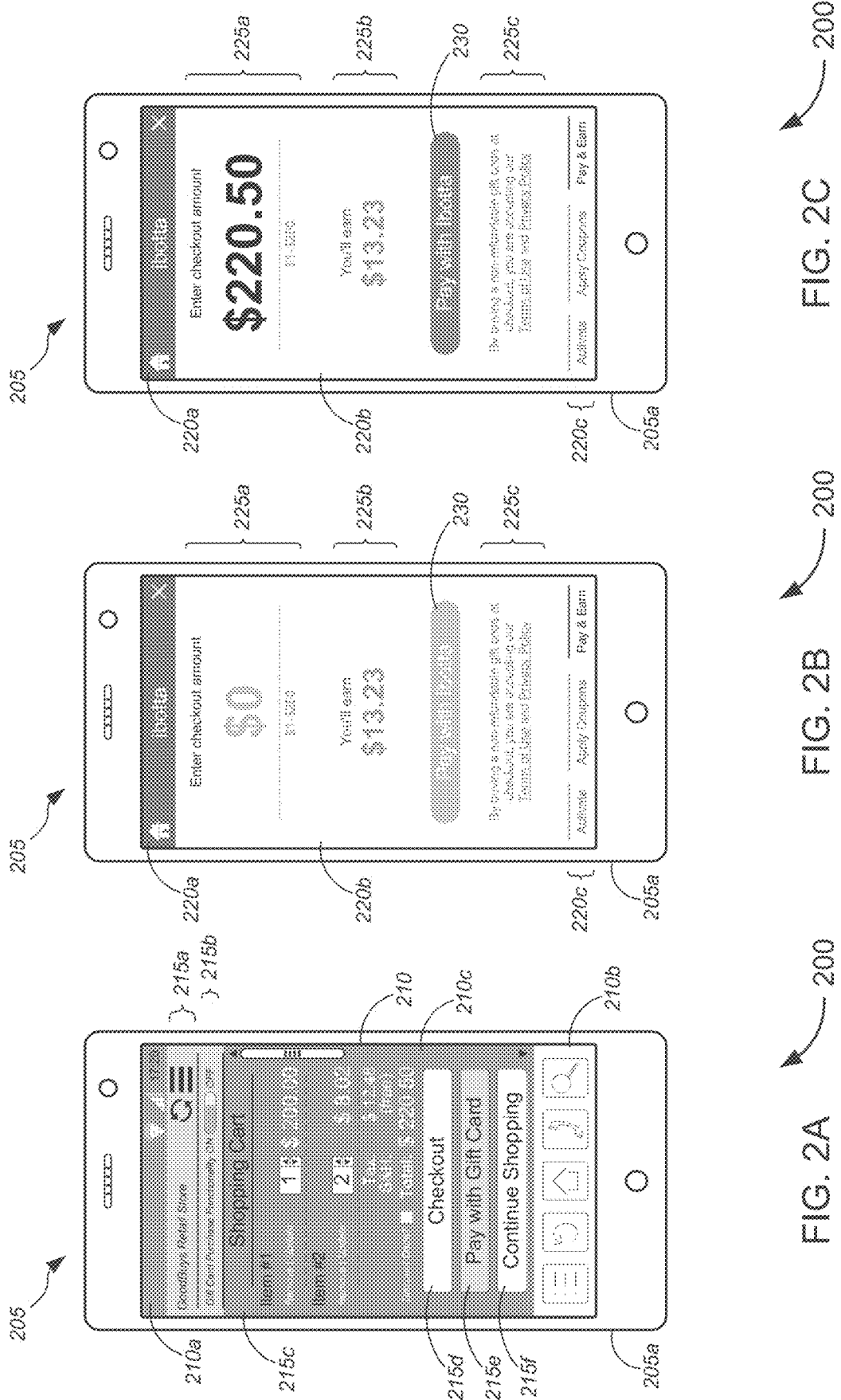

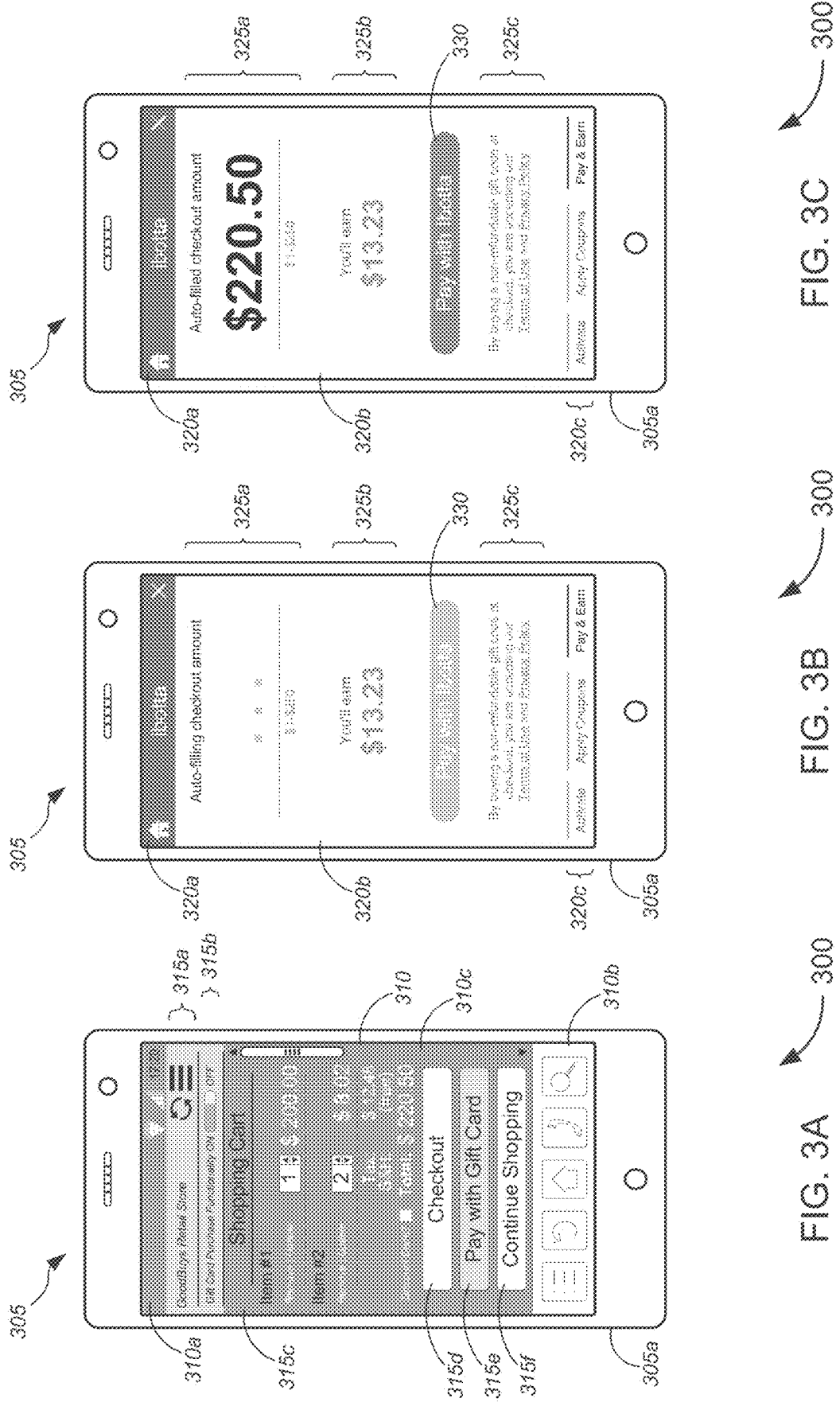

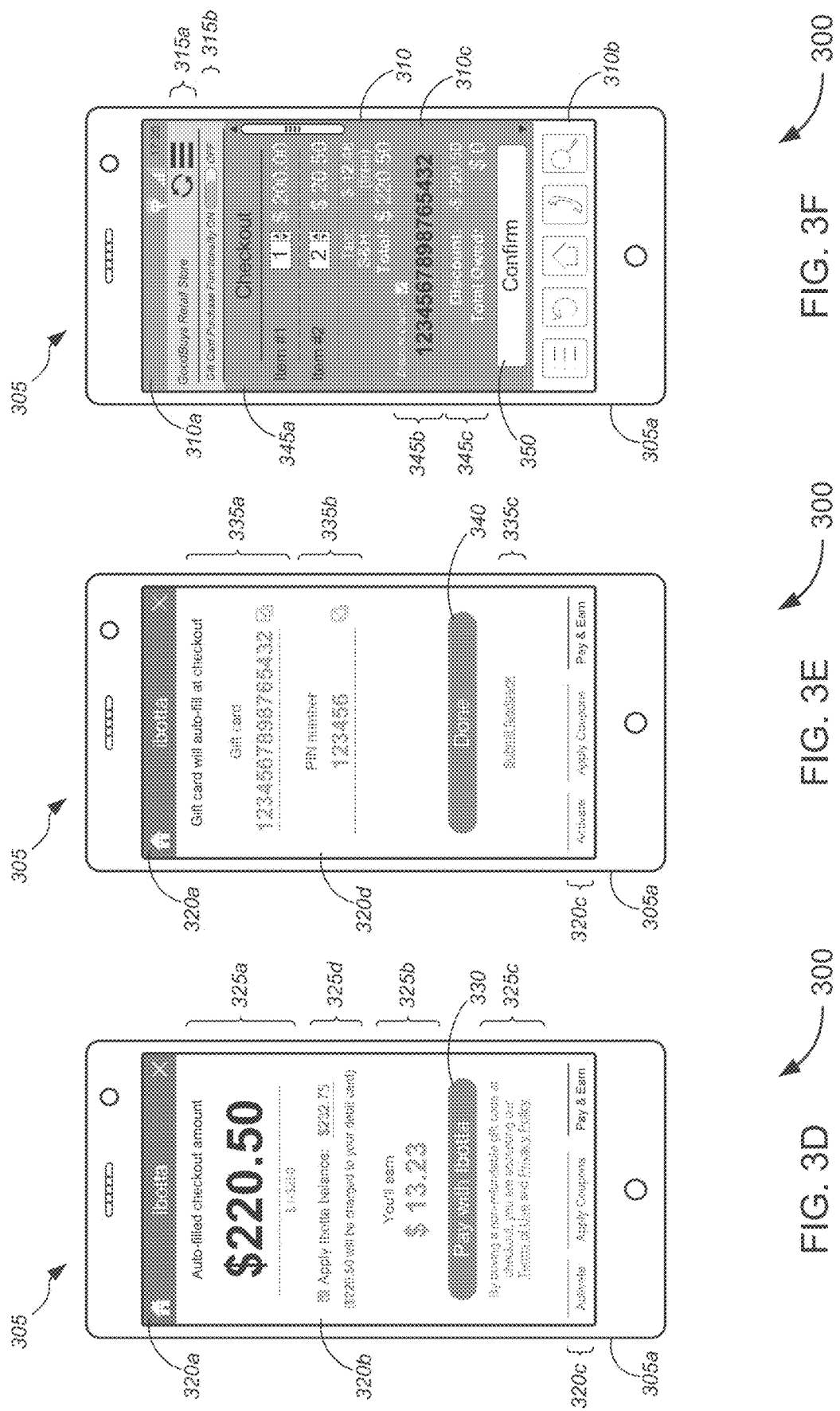

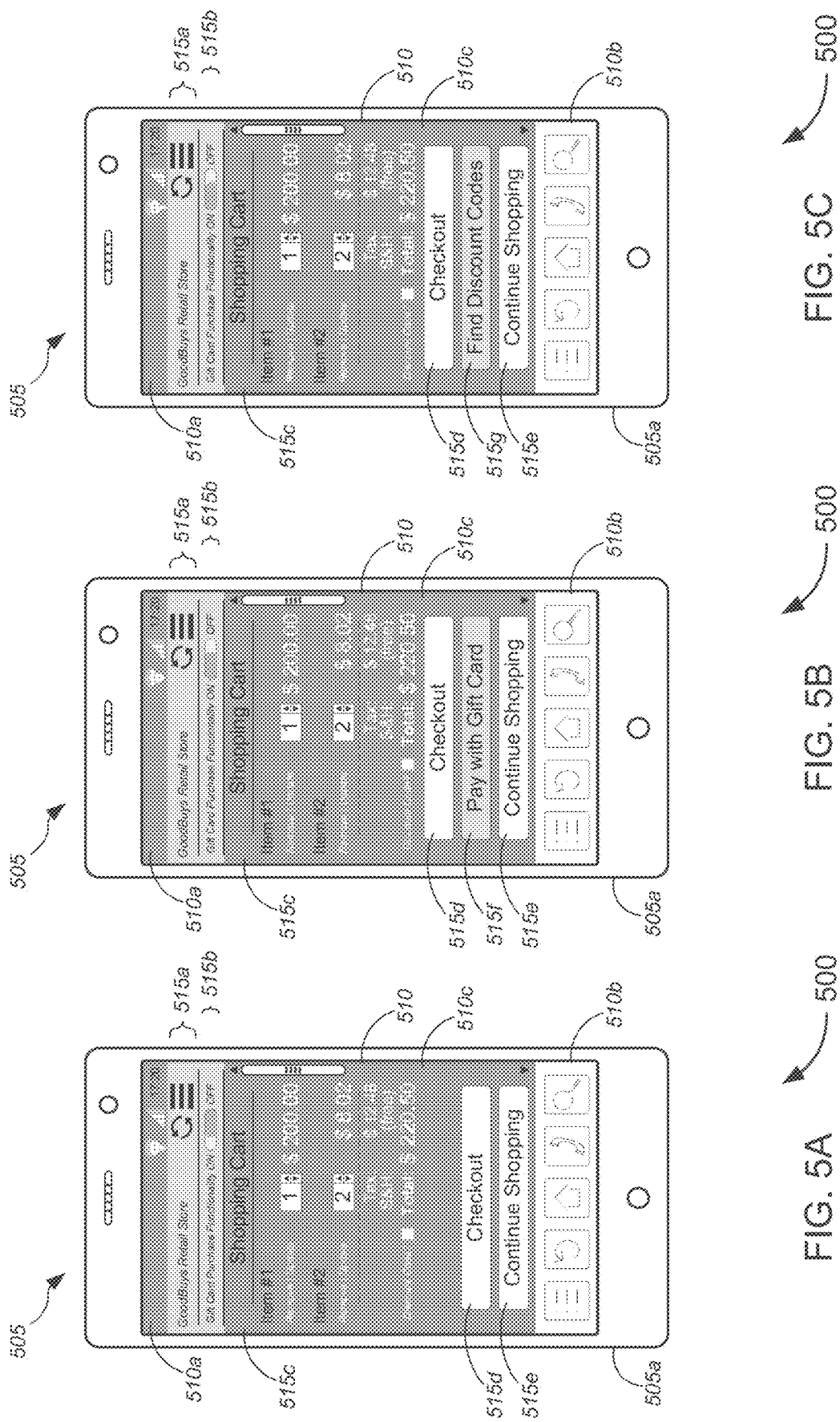

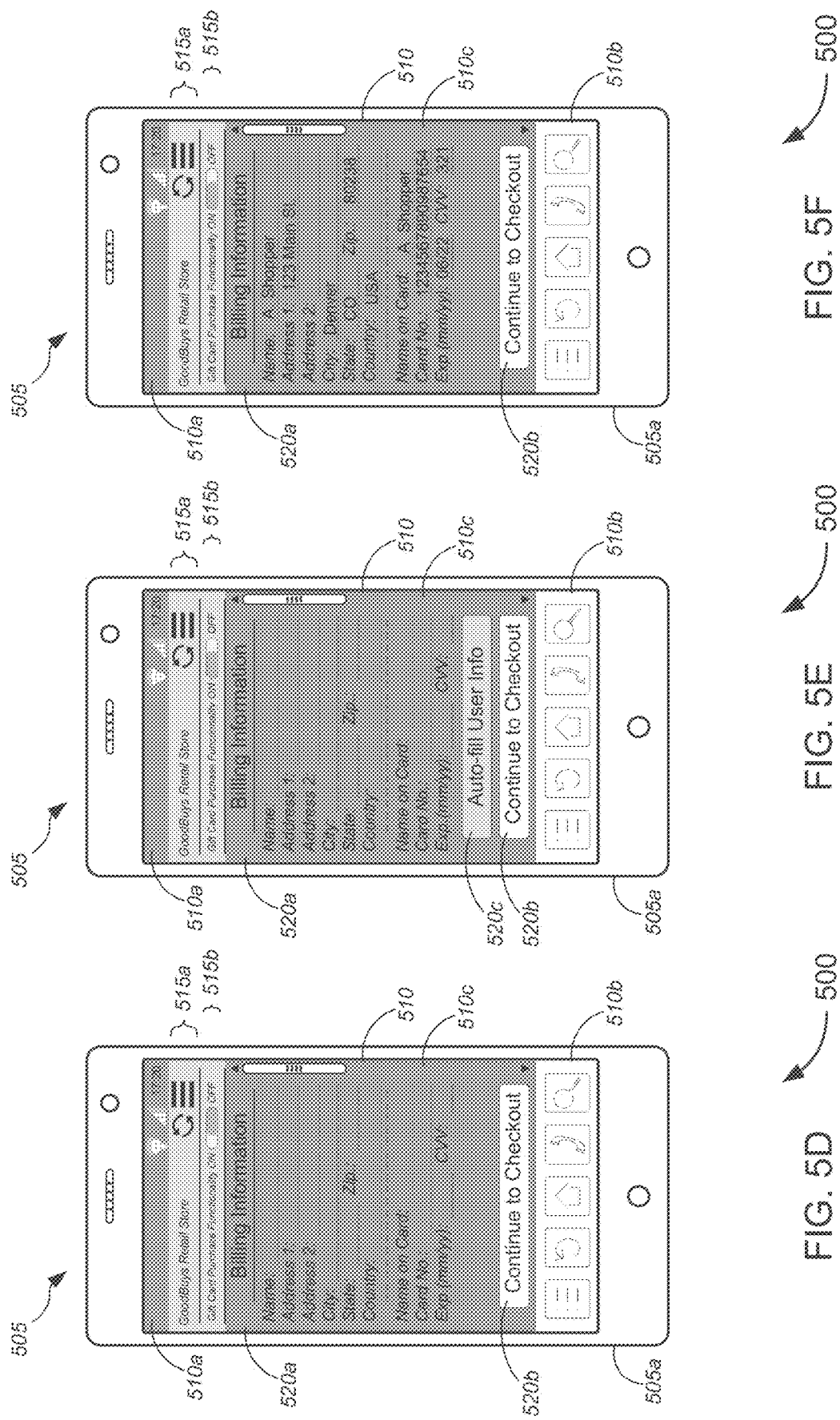

STORED-VALUE INSTRUMENT PURCHASE FUNCTIONALITY FOR ONLINE SHOPPING SYSTEMS

CROSS-REFERENCES TO RELATED APPLICATIONS

This application claims priority to U.S. Patent Application Ser. No. 62/832,484 (the "'484 Application"), filed Apr. 11, 2019 by Luke Swanson et al., entitled, "Method and System for Implementing Stored-Value Instrument Purchase Functionality for Online Shopping Systems," the disclosure of which is incorporated herein by reference in its entirety for all purposes.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to methods, systems, and apparatuses for implementing online shopping functionalities, and, more particularly, to methods, systems, and apparatuses for implementing stored-value instrument purchase functionality (e.g., gift card purchase functionality, or the like) for online shopping systems.

BACKGROUND

In conventional online sales systems, users may use gift cards to purchase items on a website of an online retailer, but such gift cards must be purchased separately through other websites or from physical (or brick-and-mortar) stores. Such online sales systems also do not provide means to purchase gift cards to purchase specific items sold on the website of the online retailer, much less providing means to autonomously assess information or content on the website of the online retailer to provide such gift card purchasing functionality or provide the users with incentives to purchase items on online retailer sites using gift cards. Such conventional online sales systems also do not provide retailers with visibility into user shopping behavior or other data insights, nor do such conventional online sales systems enable user-specific opportunities to provide targeted promotions and engagements to influence shopping behavior.

Hence, there is a need for more robust and scalable solutions for implementing online shopping functionalities, and, more particularly, to methods, systems, and apparatuses for implementing stored-value instrument purchase functionality (e.g., gift card purchase functionality, or the like) for online shopping systems.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

FIGS. 2A-2K are schematic diagrams illustrating a non-limiting example of user interfaces of a user device depicting an example of gift card purchase screens of a service provider and an example of a shopping cart screen and a checkout screen of an online shopping system for which gift card purchase functionality has been implemented, in accordance with various embodiments.

FIGS. 3A-3K are schematic diagrams illustrating another non-limiting example of user interfaces of a user device depicting an example of gift card purchase screens of a service provider and an example of a shopping cart screen and a checkout screen of an online shopping system for which gift card purchase functionality has been implemented, in accordance with various embodiments.

FIGS. 5A-5F are schematic diagrams illustrating a non-limiting example of user interfaces of a user device depicting an example of a shopping cart screen and a checkout screen of an online shopping system for which embedded checkout system functionality has been implemented, in accordance with various embodiments.

FIGS. 6A-6F are schematic diagrams illustrating a non-limiting example of user interfaces depicting an example of coupon activation and application screens of a service provider, an example of gift card purchase screens of the service provider, an example of ratings screens and suggested retailers and sales screens of the service provider, an example of account information screens of the service provider, an example of account creation and log-in screens of the service provider, and an example of search result and retailer result screens for which gift card purchase functionality has been implemented, in accordance with various embodiments.

DETAILED DESCRIPTION OF CERTAIN EMBODIMENTS

Overview

Figure 1:
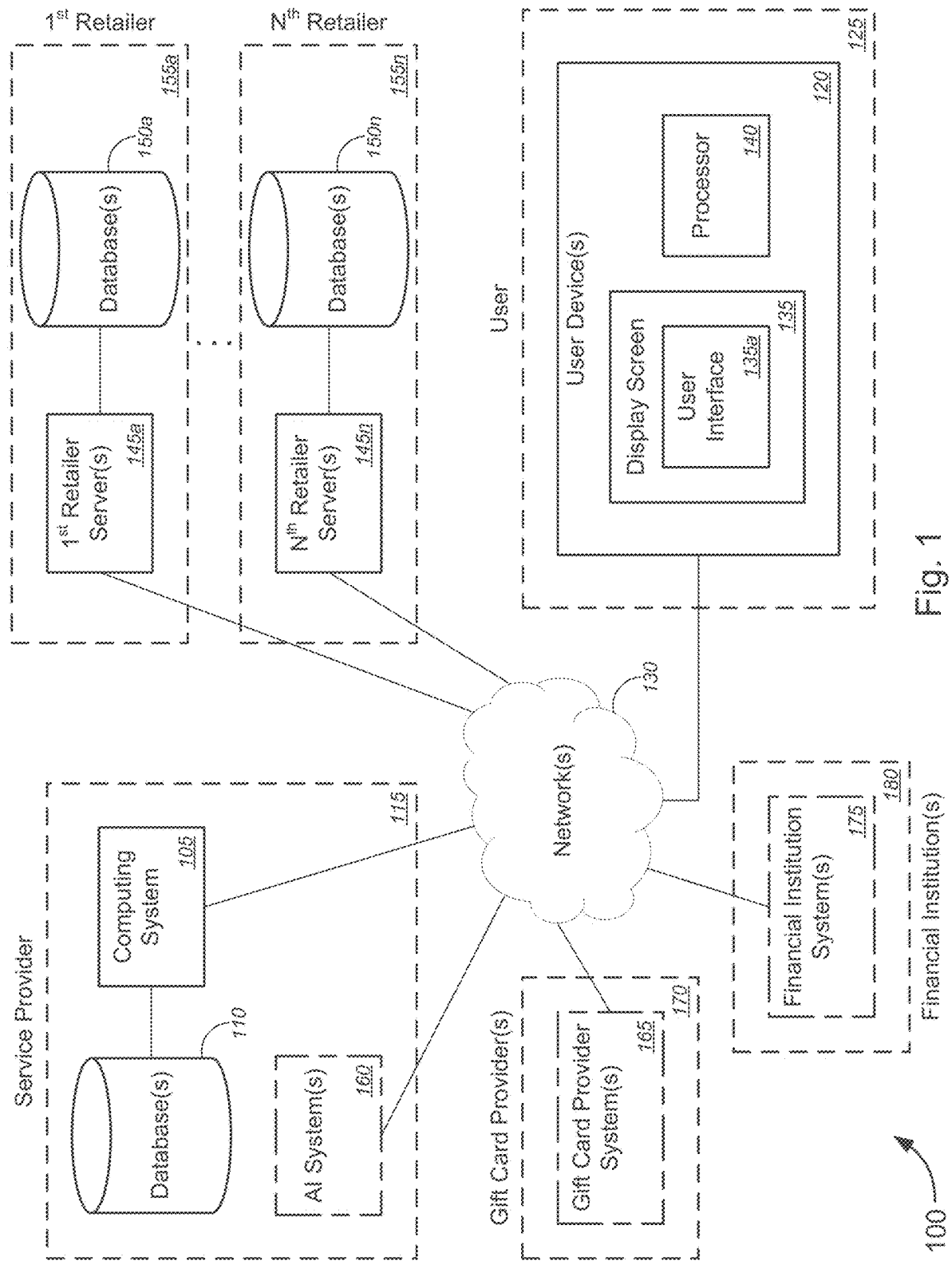
FIG. 1 is a schematic diagram illustrating a system for implementing stored-value instrument purchase functionality (e.g., gift card purchase functionality, or the like) for online shopping systems, in accordance with various embodiments.

Various embodiments provide tools and techniques for implementing online shopping functionalities, and, more particularly, to methods, systems, and apparatuses for implementing stored-value instrument purchase functionality (e.g., gift card purchase functionality, or the like) for online shopping systems.

In various embodiments, a computing system might assess at least one of content or information that is presented in at least one of a shopping cart page or a checkout page of a website associated with a retailer(s), wherein the at least one of the shopping cart page or the checkout page lists items that a user has selected for purchase from the retailer(s) and lists a total amount due on the items being purchased (which might include a sum of amounts for each item, applicable taxes, and shipping and handling fees, or the like). The computing system might autonomously modify the at least one of the shopping cart page or the checkout page of the website associated with the retailer(s) by generating a user-selectable option within the at least one of the shopping cart page or the checkout page, wherein the user-selectable option comprises an option for the user to purchase items in the at least one of the shopping cart page or the checkout page of the website associated with the retailer(s) using a gift card available for purchase from a service provider. Herein, service provider might refer to an entity that facilitates transactions between a consumer (also referred to herein as "user") and a merchant (also referred to herein as "retailer"), including, but not limited to, at least one of a gift card processor, a financial institution, a loyalty program provider, a payment processor, a coupon aggregator, a coupon finder, or an Internet service provider, and/or the like. In response to the user-selectable option being selected by the user, the computing system might provide a purchase interface that presents the user with a process (or a series of steps) to purchase a gift card having a gift card value. In response to the user completing purchase of the gift card, the computing system might apply the gift card value toward the total amount due on the items being purchased within the at least one of the shopping cart page or the checkout page of the website associated with the retailer(s). In some embodiments, the modification of the at least one of the shopping cart page or the checkout page of the website (and/or any of the steps corresponding to assessing the at least one of content or information that is presented in the at least one of the shopping cart page or the checkout page, to providing the purchase interface, and/or to applying the gift card value toward the total amount) may be implemented using one of a browser plug-in, a custom browser, a mobile browser, or a software app, and/or the like, that are associated with the service provider.

According to some embodiments, autonomously modifying the at least one of the shopping cart page or the checkout page of the website associated with the retailer(s) by generating the user-selectable option within the at least one of the shopping cart page or the checkout page might comprise autonomously modifying, with the computing system, a user interface of a user device displaying the at least one of the shopping cart page or the checkout page of the website associated with the retailer(s) by generating a user-selectable option within a portion of the at least one of the shopping cart page or the checkout page that is displayed in the user interface of the user device, wherein selection of the items for purchase might be performed by the user using the user device.

In some embodiments, the gift card might have a gift card value greater than the total amount due on the items being purchased. In such cases, a balance on the gift card after application of the gift card value to the total amount due on the items being purchased might be provided to the user as "user rewards" (which might include, without limitation, at least one of cash back, loyalty points, credit, or discounts, and/or the like). In some cases, the service provider might receive a commission as compensation for providing the service, where the commission might come from a combination of gift card sale commissions, affiliate marketing commissions, and/or promotional codes used, and/or the like. Cash back to the user, for example, might be funded by sharing, with the user, a portion of the overall commission revenue that the service provider receives. Alternatively, a balance on the gift card after application of the gift card value to the total amount due on the items being purchased might be provided as credit to the user for future online purchases through the service provider.

According to some embodiments, completion of the purchase of the gift card results in a gift card code being presented to the user, wherein applying the gift card value toward the total amount due on the items being purchased might comprise autonomously auto-filling, with the computing system, the gift card code within the at least one of the shopping cart page or the checkout page of the website associated with the retailer(s) to apply the gift card value toward the total amount due on the items being purchased. Alternatively, completion of the purchase of the gift card results in a gift card code being presented to the user and a notification being presented to the user, wherein applying the gift card value toward the total amount due on the items being purchased might comprise presenting the notification to the user, the notification including instructions on how the user can manually enter the gift card code within the at least one of the shopping cart page or the checkout page of the website associated with the retailer(s) to apply the gift card value toward the total amount due on the items being purchased.

Merely by way of example, in some cases, assessing the at least one of content or information that is presented in the at least one of the shopping cart page or the checkout page of the web site associated with the retailer(s) might comprise assessing the at least one of content or information that is presented in the at least one of the shopping cart page or the checkout page of the website associated with the retailer(s) using AI or machine learning system(s).

The various embodiments provide gift card purchasing functionalities including, but not limited to, enabling gift card purchasing functionality through a gift card provider or the like through a website associated with a retailer (where the gift card provider is separate and unaffiliated from the retailer) to enable the user to purchase items listed in the shopping cart or checkout of the retailer using a gift card purchased from the gift card provider without having to open a new browser page or tab and/or without exiting the shopping app or webpage of the retailer, by autonomously assessing the information or content on the webpage of the retailer. The various embodiments also provide retailers with greater visibility into user shopping behavior or other data insights of the user, and, in some cases, also enable user-specific opportunities to provide targeted promotions and engagements to influence shopping behavior of the user. These and other aspects of the stored-value instrument purchase functionality (e.g., gift card purchase functionality, or the like) for online shopping systems are described in greater detail with respect to the figures.

The following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

Various embodiments described herein, while embodying (in some cases) software products, computer-performed methods, and/or computer systems, represent tangible, concrete improvements to existing technological areas, including, without limitation, online shopping technology, online retail sale technology, e-commerce technology, credit payment technology, currency transfer technology, and/or the like. In other aspects, certain embodiments, can improve the functioning of user equipment or systems themselves (e.g., online shopping systems, online retail sale systems, e-commerce systems, credit payment systems, currency transfer systems, etc.), for example, by assessing, with a computing system, at least one of content or information that is presented in at least one of a shopping cart page or a checkout page of a website associated with a first retailer, wherein the at least one of the shopping cart page or the checkout page lists items that a user has selected for purchase from the first retailer and lists a total amount due on the items being purchased, wherein the computing system is associated with a service provider that is separate from, and unaffiliated with, the first retailer; autonomously modifying, with the computing system, the at least one of the shopping cart page or the checkout page of the website associated with the first retailer by generating a user-selectable option within the at least one of the shopping cart page or the checkout page, wherein the user-selectable option comprises an option for the user to purchase items in the at least one of the shopping cart page or the checkout page of the website associated with the first retailer using a gift card available for purchase from the service provider; in response to the user-selectable option being selected by the user, providing, with the computing system, a purchase interface that presents the user with a process to purchase a gift card having a gift card value; and in response to the user completing purchase of the gift card, applying, with the computing system, the gift card value toward the total amount due on the items being purchased within the at least one of the shopping cart page or the checkout page of the website associated with the first retailer; and/or the like.

The concepts present in the various embodiments can be implemented as described herein by devices, software, systems, and methods that involve specific novel functionality (e.g., steps or operations), such as, assessing, with a computing system, at least one of content or information that is presented in at least one of a shopping cart page or a checkout page of a website associated with a first retailer, wherein the at least one of the shopping cart page or the checkout page lists items that a user has selected for purchase from the first retailer and lists a total amount due on the items being purchased, wherein the computing system is associated with a service provider that is separate from, and unaffiliated with, the first retailer; autonomously modifying, with the computing system, the at least one of the shopping cart page or the checkout page of the website associated with the first retailer by generating a user-selectable option within the at least one of the shopping cart page or the checkout page, wherein the user-selectable option comprises an option for the user to purchase items in the at least one of the shopping cart page or the checkout page of the website associated with the first retailer using a gift card available for purchase from the service provider; in response to the user-selectable option being selected by the user, providing, with the computing system, a purchase interface that presents the user with a process to purchase a gift card having a gift card value; and in response to the user completing purchase of the gift card, applying, with the computing system, the gift card value toward the total amount due on the items being purchased within the at least one of the shopping cart page or the checkout page of the website associated with the first retailer; and/or the like, to name a few examples, that extend beyond mere conventional computer processing operations. These functionalities can produce tangible results outside of the implementing computer system, including, merely by way of example, optimized user experience (by modification of a website shopping cart page and/or checkout page or modification of a display interface of the website shopping cart page and/or checkout page) to enable purchase of items on a retailer shopping cart page and/or checkout page using a third party (unaffiliated) service provider that offers incentives and capability to purchase such items using a gift card purchased through the service provider, and/or the like, at least some of which may be observed or measured by customers and/or service providers.

In an aspect, a method might comprise assessing, with a computing system, at least one of content or information that is presented in at least one of a shopping cart page or a checkout page of a website associated with a first retailer, wherein the at least one of the shopping cart page or the checkout page lists items that a user has selected for purchase from the first retailer and lists a total amount due on the items being purchased, wherein the computing system is associated with a service provider that is separate from, and unaffiliated with, the first retailer. The method might further comprise autonomously modifying, with the computing system, the at least one of the shopping cart page or the checkout page of the website associated with the first retailer by generating a user-selectable option within the at least one of the shopping cart page or the checkout page, wherein the user-selectable option comprises an option for the user to purchase items in the at least one of the shopping cart page or the checkout page of the website associated with the first retailer using a gift card available for purchase from the service provider. The method might also comprise, in response to the user-selectable option being selected by the user, providing, with the computing system, a purchase interface that presents the user with a process to purchase a gift card having a gift card value. The method might further comprise, in response to the user completing purchase of the gift card, applying, with the computing system, the gift card value toward the total amount due on the items being purchased within the at least one of the shopping cart page or the checkout page of the website associated with the first retailer.

In some embodiments, the computing system might comprise a processor of the user device running a software application ("app"), a server computer over a network, a cloud-based computing system over a network, or a distributed computing system, and/or the like. In some cases, the modification of the at least one of the shopping cart page or the checkout page of the website might be implemented using one of a browser plug-in, a custom browser, a mobile browser, or a software app, and/or the like, associated with the service provider.

According to some embodiments, autonomously modifying the at least one of the shopping cart page or the checkout page of the website associated with the first retailer by generating the user-selectable option within the at least one of the shopping cart page or the checkout page might comprise autonomously modifying, with the computing system, a user interface of a user device displaying the at least one of the shopping cart page or the checkout page of the website associated with the first retailer by generating a user-selectable option within a portion of the at least one of the shopping cart page or the checkout page that is displayed in the user interface of the user device, wherein selection of the items for purchase might be performed by the user using the user device. In some instances, the user device might comprise one of a tablet computer, a laptop computer, a desktop computer, a smart phone, a mobile phone, a gaming console, a portable gaming device, or a wearable device, and/or the like.

In some embodiments, the total amount due on the items being purchased might comprise a sum of amounts for each item, applicable taxes, and shipping and handling fees, and/or the like. In some instances, the gift card might have a gift card value greater than the total amount due on the items being purchased. In such cases, a balance on the gift card after application of the gift card value to the total amount due on the items being purchased might be provided to the user as "user rewards" (which might include, without limitation, at least one of cash back, loyalty points, credit, or discounts, and/or the like). Alternatively, a balance on the gift card after application of the gift card value to the total amount due on the items being purchased might be provided as credit to the user for future online purchases through the service provider.

According to some embodiments, completion of the purchase of the gift card might result in a gift card code being presented to the user, wherein applying the gift card value toward the total amount due on the items being purchased might comprise autonomously auto-filling, with the computing system, the gift card code within the at least one of the shopping cart page or the checkout page of the website associated with the first retailer to apply the gift card value toward the total amount due on the items being purchased. Alternatively, completion of the purchase of the gift card might result in a gift card code being presented to the user and a notification being presented to the user, the notification including instructions on how the user can manually enter the gift card code within the at least one of the shopping cart page or the checkout page of the website associated with the first retailer to apply the gift card value toward the total amount due on the items being purchased.

Merely by way of example, in some cases, assessing the at least one of content or information that is presented in the at least one of the shopping cart page or the checkout page of the website associated with the first retailer might comprise assessing the at least one of content or information that is presented in the at least one of the shopping cart page or the checkout page of the website associated with the first retailer using artificial intelligence ("AI") systems or machine learning systems.

In another aspect, an apparatus might comprise at least one processor and a non-transitory computer readable medium communicatively coupled to the at least one processor. The non-transitory computer readable medium might have stored thereon computer software comprising a set of instructions that, when executed by the at least one processor, causes the apparatus to: assess at least one of content or information that is presented in at least one of a shopping cart page or a checkout page of a website associated with a first retailer, wherein the at least one of the shopping cart page or the checkout page lists items that a user has selected for purchase from the first retailer and lists a total amount due on the items being purchased, wherein the apparatus is associated with a service provider that is separate from, and unaffiliated with, the first retailer; autonomously modify the at least one of the shopping cart page or the checkout page of the website associated with the first retailer by generating a user-selectable option within the at least one of the shopping cart page or the checkout page, wherein the user-selectable option comprises an option for the user to purchase items in the at least one of the shopping cart page or the checkout page of the website associated with the first retailer using a gift card available for purchase from the service provider; in response to the user-selectable option being selected by the user, provide a purchase interface that presents the user with a process to purchase a gift card having a gift card value; and in response to the user completing purchase of the gift card, apply the gift card value toward the total amount due on the items being purchased within the at least one of the shopping cart page or the checkout page of the website associated with the first retailer.

In some embodiments, the apparatus might comprise a processor of the user device running a software application ("app"), a server computer over a network, a cloud-based computing system over a network, or a distributed computing system, and/or the like. In some cases, the modification of the at least one of the shopping cart page or the checkout page of the website might be implemented using one of a browser plug-in, a custom browser, a mobile browser, or a software app associated with the service provider, and/or the like.

According to some embodiments, autonomously modifying the at least one of the shopping cart page or the checkout page of the website associated with the first retailer by generating the user-selectable option within the at least one of the shopping cart page or the checkout page might comprise autonomously modifying a user interface of a user device displaying the at least one of the shopping cart page or the checkout page of the website associated with the first retailer by generating a user-selectable option within a portion of the at least one of the shopping cart page or the checkout page that is displayed in the user interface of the user device, wherein selection of the items for purchase might be performed by the user using the user device. In some instances, the user device might comprise one of a tablet computer, a laptop computer, a desktop computer, a smart phone, a mobile phone, a gaming console, a portable gaming device, or a wearable device, and/or the like.

In some embodiments, completion of the purchase of the gift card might result in a gift card code being presented to the user, wherein applying the gift card value toward the total amount due on the items being purchased might comprise autonomously auto-filling the gift card code within the at least one of the shopping cart page or the checkout page of the web site associated with the first retailer to apply the gift card value toward the total amount due on the items being purchased. Alternatively, completion of the purchase of the gift card might result in a gift card code being presented to the user and a notification being presented to the user, the notification including instructions on how the user can manually enter the gift card code within the at least one of the shopping cart page or the checkout page of the website associated with the first retailer to apply the gift card value toward the total amount due on the items being purchased.

Merely by way of example, in some cases, assessing the at least one of content or information that is presented in the at least one of the shopping cart page or the checkout page of the website associated with the first retailer might comprise assessing the at least one of content or information that is presented in the at least one of the shopping cart page or the checkout page of the website associated with the first retailer using artificial intelligence ("AI") systems or machine learning systems.

In yet another aspect, a system might comprise a computing system, which might comprise at least one first processor and a first non-transitory computer readable medium communicatively coupled to the at least one first processor. The first non-transitory computer readable medium might have stored thereon computer software comprising a first set of instructions that, when executed by the at least one first processor, causes the computing system to: assess at least one of content or information that is presented in at least one of a shopping cart page or a checkout page of a website associated with a first retailer, wherein the at least one of the shopping cart page or the checkout page lists items that a user has selected for purchase from the first retailer and lists a total amount due on the items being purchased, wherein the computing system is associated with a service provider that is separate from, and unaffiliated with, the first retailer; autonomously modify the at least one of the shopping cart page or the checkout page of the website associated with the first retailer by generating a user-selectable option within the at least one of the shopping cart page or the checkout page, wherein the user-selectable option comprises an option for the user to purchase items in the at least one of the shopping cart page or the checkout page of the website associated with the first retailer using a gift card available for purchase from the service provider; in response to the user-selectable option being selected by the user, provide a purchase interface that presents the user with a process to purchase a gift card having a gift card value; and in response to the user completing purchase of the gift card, apply the gift card value toward the total amount due on the items being purchased within the at least one of the shopping cart page or the checkout page of the website associated with the first retailer.

In still another aspect, a method might comprise, in response to a user selecting to purchase items sold by a third party retailer using a gift card that is sold to the user by a service provider, applying, with a computing system associated with the service provider, a value of the gift card toward a total amount due on the items being purchased on a website associated with the third party retailer.

Various modifications and additions can be made to the embodiments discussed without departing from the scope of the invention. For example, while the embodiments described above refer to particular features, the scope of this invention also includes embodiments having different combination of features and embodiments that do not include all of the above described features.

Specific Exemplary Embodiments

We now turn to the embodiments as illustrated by the drawings. FIGS. 1-8 illustrate some of the features of the method, system, and apparatus for implementing online shopping functionalities, and, more particularly, to methods, systems, and apparatuses for implementing stored-value instrument purchase functionality (e.g., gift card purchase functionality, or the like) for online shopping systems, as referred to above. The methods, systems, and apparatuses illustrated by FIGS. 1-8 refer to examples of different embodiments that include various components and steps, which can be considered alternatives or which can be used in conjunction with one another in the various embodiments. The description of the illustrated methods, systems, and apparatuses shown in FIGS. 1-8 is provided for purposes of illustration and should not be considered to limit the scope of the different embodiments.

With reference to the figures, FIG. 1 is a schematic diagram illustrating a system 100 for implementing stored-value instrument purchase functionality (e.g., gift card purchase functionality, or the like) for online shopping systems, in accordance with various embodiments.

In the non-limiting embodiment of FIG. 1, system 100 might comprise a computing system 105 and corresponding database(s) 110, both associated with service provider 115. Herein, service provider 115 might refer to an entity that facilitates transactions between a consumer (also referred to herein as "user") and a merchant (also referred to herein as "retailer"), including, but not limited to, at least one of a gift card processor, a financial institution, a loyalty program provider, a payment processor, a coupon aggregator, a coupon finder, or an Internet service provider, and/or the like. In some embodiments, the computing system 105 might include, without limitation, a processor of the user device running a software application ("app"), a server computer over a network, a cloud-based computing system over a network, or a distributed computing system, and/or the like. System 100 might further comprise a user device(s) 120 associated with a user 125. In some cases, the user device 120 might include, but is not limited to, one of a tablet computer, a laptop computer, a desktop computer, a smart phone, a mobile phone, a gaming console, a portable gaming device, or a wearable device, and/or the like. According to some embodiments, the computing system 105 might communicatively couple to each of the user devices 120 via network(s) 130. In some instances, each user device 120 might comprise a display screen 135 (which might include a user interface 135a) and a processor 140.

In some embodiments, the network(s) 130 might each include a local area network ("LAN"), including, without limitation, a fiber network, an Ethernet network, a Token-Ring™ network, and/or the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including, without limitation, a network operating under any of the IEEE 802.11 suite of protocols, the Bluetooth™ protocol known in the art, and/or any other wireless protocol; and/or any combination of these and/or other networks. In a particular embodiment, the network(s) 130 might include an access network of an Internet service provider ("ISP"). In another embodiment, the network(s) 130 might include a core network of the ISP, and/or the Internet.

According to some embodiments, system 100 might further comprise first through $N^{th}$ retailer servers 145a-145n (collectively, "retailer servers 145" or the like) and corresponding databases 150a-150n (collectively, "databases 150" or the like). Each retailer server 145 and corresponding database(s) 150 might be associated with a merchant or retailer 155 and might host an online shopping website associated with the merchant or retailer 155. For instance, the first retailer server(s) 145a and corresponding database(s) 150a might be associated with the first retailer 155a, and so on, through the $N^{th}$ retailer server(s) 145n and corresponding database(s) 150n might be associated with the $N^{th}$ retailer 155n. The computing system 105 that is associated with service provider 115 is separate from, and unaffiliated with, any of the first through $N^{th}$ retailers 155a-155n. In some instances, system 100 might further comprise one or more artificial intelligence ("AI") or machine learning systems 160.

In some embodiments, system 100 might further comprise one or more gift card provider systems 165 associated with one or more gift card providers 170 and/or one or more financial institution systems 175 associated with one or more financial institutions 180. In some cases, at least one gift card provider 170 among the one or more gift card providers 170 and the service provider 115 might be the same entity(ies), and the gift card provider system(s) 165 associated with the at least one gift card provider 170 and the computing system 105 or the AI system(s) 160 might be the same system(s). Alternatively, at least one gift card provider 170 among the one or more gift card providers 170 and at least one retailer 155 among the one or more retailers 155a-155n might be the same entity(ies), and the gift card provider system(s) 165 associated with the at least one gift card provider 170 and the retailer server(s) 145a-145n associated with the at least one retailer 155 might be the same system(s). In yet another alternative embodiment, the one or more gift card providers 170 might be separate from each of the service provider 115 and the one or more retailers 155a-155n. In some instances, at least one financial institution 180 among the one or more financial institution systems 180 and the service provider 115 might be the same entity(ies), and the financial institution system(s) 175 associated with the at least one financial institution 180 and the computing system 105 or the AI system(s) 160 might be the same system(s). Alternatively, at least one financial institution 180 among the one or more financial institutions 180 and at least one retailer 155 among the one or more retailers 155a-155n might be the same entity(ies), and the financial institution system(s) 175 associated with the at least one financial institution 180 and the retailer server(s) 145a-145n associated with the at least one retailer 155 might be the same system(s). In yet another alternative embodiment, the one or more financial institutions 180 might be separate from each of the service provider 115 and the one or more retailers 155a-155n.

In operation, the computing system 105, the gift card provider system(s) 165, or the financial institution system(s) 175 (collectively, "computing system" or the like) might assess at least one of content or information that is presented in at least one of a shopping cart page or a checkout page of a website associated with a first retailer (e.g., first retailer 155a, or the like) that may be hosted on a server (e.g., first retailer server(s) 145a, or the like), wherein the at least one of the shopping cart page or the checkout page lists items that a user has selected for purchase from the first retailer and lists a total amount due on the items being purchased (which might include a sum of amounts for each item, applicable taxes, and shipping and handling fees, or the like). The computing system might autonomously modify the at least one of the shopping cart page or the checkout page of the web site associated with the first retailer by generating a user-selectable option within the at least one of the shopping cart page or the checkout page, wherein the user-selectable option comprises an option for the user to purchase items in the at least one of the shopping cart page or the checkout page of the website associated with the first retailer using a gift card available for purchase from the service provider. In response to the user-selectable option being selected by the user, the computing system might provide a purchase interface that presents the user with a process (or a series of steps) to purchase a gift card having a gift card value that covers the total amount due on the items being purchased. In response to the user completing purchase of the gift card, the computing system might apply the gift card value toward the total amount due on the items being purchased within the at least one of the shopping cart page or the checkout page of the website associated with the first retailer. Alternatively, the user might purchase a gift card having a gift card value that is less than the total amount due on the items being purchased within the at least one of the shopping cart page or the checkout page of the website associated with the first retailer. In such cases, in response to the user completing purchase of the gift card, the computing system might apply the gift card value toward the total amount due on the items being purchased within the at least one of the shopping cart page or the checkout page of the website associated with the first retailer, with the system presenting the user with payment options for payment of the remaining balance on the total amount due on the items being purchased within the at least one of the shopping cart page or the checkout page of the website associated with the first retailer. In some embodiments, the modification of the at least one of the shopping cart page or the checkout page of the website (and/or any of the steps corresponding to assessing the at least one of content or information that is presented in the at least one of the shopping cart page or the checkout page, to providing the purchase interface, and/or to applying the gift card value toward the total amount) may be implemented using one of a browser plug-in, a custom browser, a mobile browser, or a software app, and/or the like, that are associated with the service provider 115.

According to some embodiments, autonomously modifying the at least one of the shopping cart page or the checkout page of the website associated with the first retailer by generating the user-selectable option within the at least one of the shopping cart page or the checkout page might comprise autonomously modifying, with the computing system, a user interface of a user device (e.g., user interface 135a of user device 120, or the like) displaying the at least one of the shopping cart page or the checkout page of the web site associated with the first retailer by generating a user-selectable option within a portion of the at least one of the shopping cart page or the checkout page that is displayed in the user interface of the user device (e.g., user interface 135a of user device 120, or the like), wherein selection of the items for purchase might be performed by the user 125 using the user device 120.

In some embodiments, the gift card might have a gift card value greater than the total amount due on the items being purchased. In such cases, a balance on the gift card after application of the gift card value to the total amount due on the items being purchased might be provided to the user 125 as "user rewards" (which might include, without limitation, at least one of cash back, loyalty points, credit, or discounts, and/or the like). In some cases, the service provider 115 might receive a commission as compensation for providing the service, where the commission might come from a combination of gift card sale commissions, affiliate marketing commissions, and/or promotional codes used, and/or the like. Cash back to the user, for example, might be funded by sharing, with the user, a portion of the overall commission revenue that the service provider receives. Alternatively, a balance on the gift card after application of the gift card value to the total amount due on the items being purchased might be provided as credit to the user 125 for future online purchases through the service provider 115. Merely by way of example, in some instances, the computing system might provide incentives to the user 125 for purchasing, or paying for, the items listed in the at least one of the shopping cart page or the checkout page of the website associated with the first retailer. Such incentives might include, without limitation, offers to provide double or triple cash back if the user selects to purchase the items using gift cards available for purchase from the service provider 115, offers to apply a discount (or a further discount) on the total amount due on the items being purchased if the user selects to purchase the items using gift cards available for purchase from the service provider 115, offers for further cash back on future purchases by purchasing the items using gift cards now or within a limited time period, or offers for future discounts on future purchases by purchasing the items using gift cards now or within a limited time period, and/or the like.

According to some embodiments, completion of the purchase of the gift card results in a gift card code being presented to the user, wherein applying the gift card value toward the total amount due on the items being purchased might comprise autonomously auto-filling, with the computing system, the gift card code within the at least one of the shopping cart page or the checkout page of the website associated with the first retailer to apply the gift card value toward the total amount due on the items being purchased. Alternatively, completion of the purchase of the gift card results in a gift card code being presented to the user and a notification being presented to the user, wherein applying the gift card value toward the total amount due on the items being purchased might comprise presenting the notification to the user, the notification including instructions on how the user can manually enter (or copy and paste) the gift card code within the at least one of the shopping cart page or the checkout page of the website associated with the first retailer to apply the gift card value toward the total amount due on the items being purchased. Alternative to auto-filling the gift card code or having the user copy and paste (or manually enter) the gift card code, the computing system might copy the gift card code to the system clipboard and might provide a notification to the user regarding how and where to paste the gift card code (in particular, where the auto-fill functionality is disabled or unsupported, for example). According to some embodiments, part of the gift card purchase functionality might provide the option that is selectable by the user to automatically reload the gift card if the balance on the gift card drops below a predetermined, selected, or certain threshold value (e.g., $10 or other user selectable value, or the like). After such option has been selected by the user, in response to the balance on the gift card dropping below the predetermined, selected, or certain threshold value, the system (e.g., computing system 105 or the like) might automatically reload the gift card to a preselected or specific amount (e.g., $100 or other user selectable value, or the like) on behalf of the user, by using payment methods (e.g., credit card, debit card, automated clearing house ("ACH") bank transfer, cryptocurrency, etc.) that the user had previously arranged or authorized.

Merely by way of example, in some cases, assessing the at least one of content or information that is presented in the at least one of the shopping cart page or the checkout page of the website associated with the first retailer might comprise assessing the at least one of content or information that is presented in the at least one of the shopping cart page or the checkout page of the website associated with the first retailer using AI or machine learning system(s) 160.

These and other functions of the system 100 (and its components) are described in greater detail below with respect to FIGS. 2-4.

FIGS. 2A-2K (collectively, "FIG. 2") are schematic diagrams illustrating a non-limiting example 200 of user interfaces of a user device depicting an example of gift card purchase screens of a service provider and an example of a shopping cart screen and a checkout screen of an online shopping system for which gift card purchase functionality has been implemented, in accordance with various embodiments.

As shown in the non-limiting example 200 of FIG. 2, the series of depicted user interfaces of the user device illustrate manual entry by a user of a checkout amount (e.g., a total amount due on the items being purchased, which may include a sum of amounts for each item, applicable taxes, and shipping and handling fees, or the like). In some cases, a computing system associated with a service provider might calculate a credit amount that the user can earn by purchasing the checkout items (based on the manually entered checkout amount) using a gift card purchased through the service provider. By selecting to pay the checkout items using the gift card, the user may be provided with a series of steps or screens to purchase the gift card using the user's credit card or debit card (or other payment options (e.g., PayPal, automated clearing house ("ACH") bank transfer, cryptocurrencies, or other forms of payment)). In some cases, a third party financial institution might handle the payment portion of the purchase of the gift card, thereby relieving the service provider of the need to store or otherwise be exposed to details of the user's payment methods (e.g., the user's credit card number, the user's debit card number, ACH bank transfer, etc.). Once the gift card has been purchased, the computing system might generate a gift card code with instructions for the user to manually enter such gift card code within a portion of the at least one of the shopping cart page or the checkout page of the retailer from which the user is purchasing items (that add up to the checkout amount). After manually entering the gift card code in the at least one of the shopping cart page or the checkout page, the transaction with the retailer would be complete. The balance remaining in the gift card after purchasing the items may be provided to the user as "user rewards" (which might include, without limitation, at least one of cash back, loyalty points, credit, or discounts, and/or the like). In some cases, the service provider might receive a commission as compensation for providing the gift card purchasing service, where the commission might come from a combination of gift card sale commissions, affiliate marketing commissions, and/or promotional codes used, and/or the like. Cash back to the user, for example, might be funded by sharing, with the user, a portion of the overall commission revenue that the service provider receives. Alternatively, the balance remaining in the gift card after purchasing the items may be provided to the user as a credit on further online purchases through the service provider.

Specifically, with reference to FIGS. 2A-2F, FIG. 2A depicts a non-limiting example of a user device 205 (which might include, without limitation, one of a tablet computer, a laptop computer, a desktop computer, a smart phone, a mobile phone, a gaming console, a portable gaming device, or a wearable device, and/or the like; in this case, a smart phone). According to some embodiments, the user device 205 might comprise a housing 205a, a display screen 210, and a retail or shopping software application ("app") 215 running on the user device 205 and being displayed on the display screen 210. Alternative to the app 215, a web portal (not shown), a browser plug-in for a browser (not shown), or a custom browser (not shown) may be implemented. In the non-limiting example of FIG. 2A, the display screen 210 might comprise a header portion 210a, a quick task portion 210b, and a main display portion 210c. In the header portion 210a might be displayed at least one of time of day, cellular communications signal strength icon, and/or wireless communications signal strength icon, or the like. In the quick task portion 210b might be displayed at least one of a main menu button, a back or undo button, a home button, a call button, a search button, and/or the like. In the main display portion 210c might be displayed the retail or shopping app 215, which might include, but is not limited to, at least one of an app header portion 215a (which might include, without limitation, at least one of an app title or retail store name, a refresh button, or a menu icon, and/or the like), a gift card purchase functionality option portion 215b (which might provide the user with the option to turn on or off automatic implementation of gift card purchase functionality (as described herein), or the like), a shopping cart screen 215c associated with the retailer, a checkout button 215d, a pay with gift card button 215e, and a continue shopping button 215f, and/or the like.

As depicted in FIG. 2A, the shopping cart screen 215c might comprise portions listing the items selected for purchase by the user (in this case, Item #1 and Item #2), the quantities for each item (with options to remove or update such quantities or items; in this example, one of Item #1 and two of Item #2), the price for each item (in this example, $200.00 for Item #1 and $8.02 for two of Item #2), the tax applicable on this purchase (in this example, $12.48, using a tax rate of 6%), the shipping and handling fees (in this example, $0 as shipping is free for this particular example order), a selection for whether or not to apply a discount code (which may include, but is not limited to, a promotion or promo code, a discount code, a gift card code, and/or the like), and the total purchase price on this order (in this example, $220.50). In the case that the user selects the pay with gift card button 215e, the user is taken to the webpage or app screens for the service provider providing gift card purchase functionality (in this case, Ibotta; although not limited to this particular service provider), as shown in FIG. 2B.

Turning to FIGS. 2B and 2C, in response to the user selecting to pay with a gift card, the display screen 210 might comprise gift card purchase app or screens 220, which might include, without limitation, a header portion 220a (which might include, but is not limited to, an gift card purchase app title or service provider name, a return home button, and a close button, or the like), a main display portion 220b, and a quick link portion 220c (which might include, but is not limited to, an activate link, a apply coupons link, and a pay & earn link, and/or the like). Within the main display portion 220b might be a checkout amount field 225a, a rewards field 225b, a message field 225c, and a pay with Ibotta button 230. The checkout amount field 225a might prompt the user to manually enter the checkout amount or the total purchase price of the items listed in the shopping cart or checkout page of the retailer site. The rewards field 225b might display the amount of credit or rewards that the user would earn for purchasing the items using the gift card. The message field 225c might display a message to the user (e.g., a legal message indicating that the user accepts the terms of use and privacy policy by buying a non-refundable gift code at checkout, or the like). The pay with Ibotta button 230, when selected, takes the user through the process of purchasing the gift card for the purpose of paying for the items on the retail shopping cart or checkout screen (e.g., as shown in FIG. 2A, or the like). FIG. 2B depicts the gift card purchase screens 220 before the user has manually entered the checkout amount, while FIG. 2C depicts the gift card purchase screens 220 after the user has manually entered the checkout amount (in this case, $220.50). In response to the user manually entering the checkout amount, the grayed-out pay with Ibotta button 230 (shown in FIG. 2B) would become selectable by the user (shown in FIG. 2C).

Figures 2D, 2E, 2F:
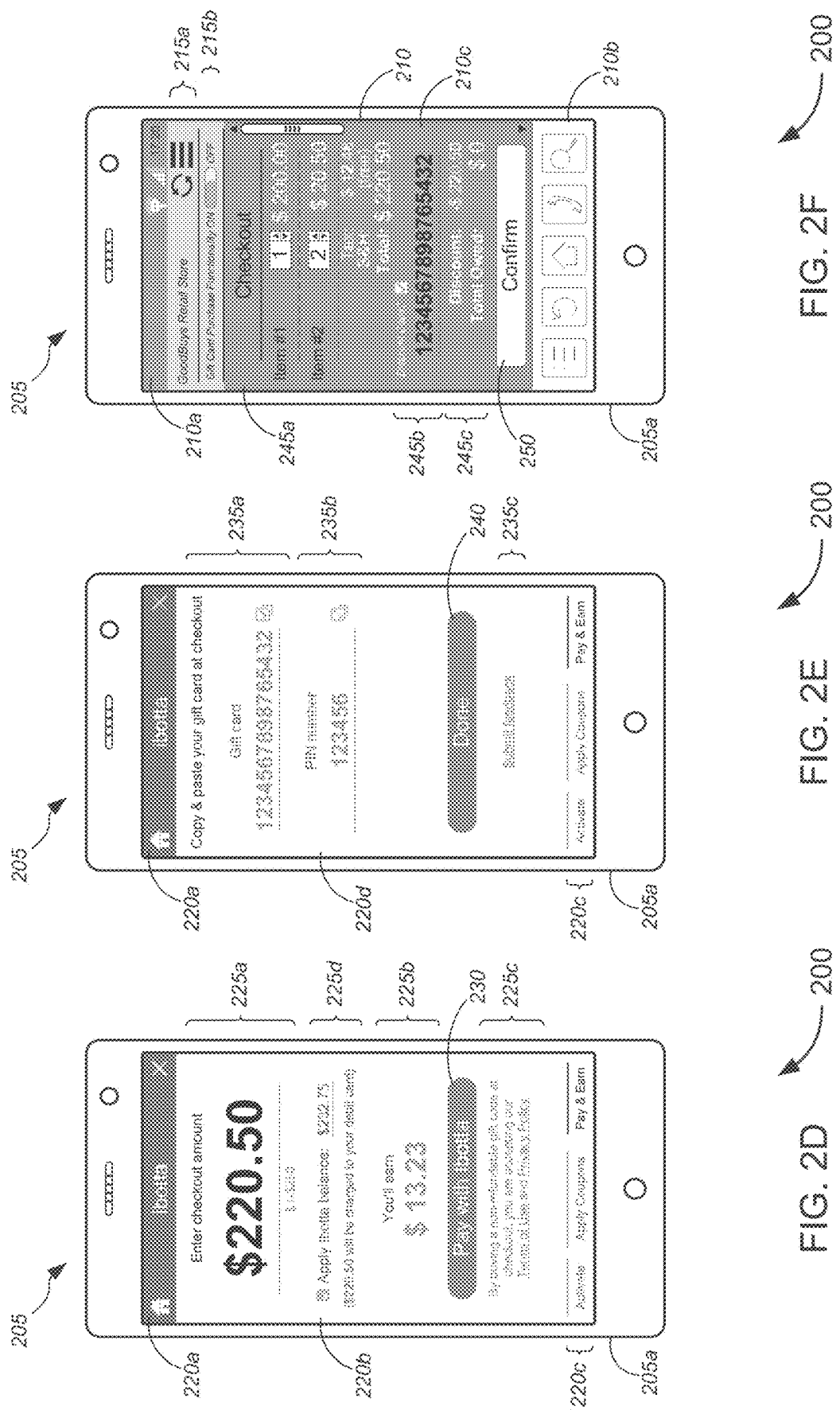

With reference to FIG. 2D, after the user has manually entered the checkout amount, an apply Ibotta balance prompt field 225d may be displayed, which when selected (as depicted in FIG. 2D by a checked selection box) would apply the user's balance with the service provider (in this example, $232.75, or the like) and would charge the user a certain amount (in this case, the amount equal to the checkout amount or $220.50). Selecting the pay with Ibotta button 230 at this stage would result in the generation of a gift card code (as shown in FIG. 2E). Alternative to using the user's balance with the service provider, the user might be taken through a portal (which may or may not be a third party portal) that takes the user through steps to purchase the gift card (including entering the user's debit card information). Although not shown, alternative to paying for the gift card using a debit card, any suitable payment method may be used, including, but not limited to, payment using a credit card, payment using a gift card, payment using ACH bank transfer, payment using a cryptocurrency, payment using PayPal, etc.

Referring to FIG. 2E, the gift card purchase screens 220 might further comprise a gift card screen 220d, within which might include, but is not limited to, a gift card display field 235a, a pin number display field 235b, a submit feedback link 235c, and a done button 240. The gift card display field 235a might display the generated gift card code (in this example, "1234567898765432" or the like), with instructions for the user to copy and paste the gift card code at checkout of the retailer site. The pin number display field 235b might display a pin number associated with the gift card code, which the user may use to recover the gift card code if lost or forgotten. The submit feedback link 235c might include a link for the user to submit feedback regarding the gift card purchase app 220. After selecting done, the user may be taken to the checkout page of the retailer site, as shown in FIG. 2F.

Turning to FIG. 2F, the retail or shopping app 215 might comprise a checkout screen 245, which might include, but is not limited to, a summary checkout display field 245a, a discount code field 245b, a discount-adjusted total price field 245c, and a confirm button 250. The summary checkout display field 245a might display a summary of the items selected for purchase by the user (in this case, Item #1 and Item #2), the quantities for each item (with options to remove or update such quantities or items; in this example, one of Item #1 and two of Item #2), the price for each item (in this example, $200.00 for Item #1 and $8.02 for two of Item #2), the tax applicable on this purchase (in this example, $12.48, using a tax rate of 6%), the shipping and handling fees (in this example, $0 as shipping is free for this particular example order), and the total purchase price on this order prior to application of the discount code (in this example, $220.50). The discount code field 245*b* might display a field in which the user can select to enter a discount code, a promo code, or a gift card code, and/or the like (as depicted in FIG. 2F by the checked selection box beside the discount code prompt) and an input field in which the user can manually enter the gift card code (as depicted in FIG. 2E). The discount-adjusted total price field 245*c* might display the amount of discount applied by entry of the discount code (in this case, the gift card code) and the total amount owed after application of the discount code (in this case, $0 as the gift card value equals the checkout price or total purchase price). The confirm button 250, when selected by the user, confirms the purchase of the items using the gift card code.

Although not shown in FIG. 2, the gift card value that is purchased by the user through the screens shown in FIGS. 2C-2E might be a value that is greater than the checkout price or total purchase price (e.g., $225, $230, $240, $250, or any suitable value that is either anticipated by the computing system of the service provider, selectable or modifiable by the user, or the like). The balance remaining on the gift card after application to the checkout price or total purchase price may be provided to the user as user rewards (in which the service provider might receive a commission, or the like) or may be applied to future purchases by the user using the service provided by the service provider (which may be reflected in the user's balance with the service provider as depicted in FIG. 2D, or the like).

Figure 2G:
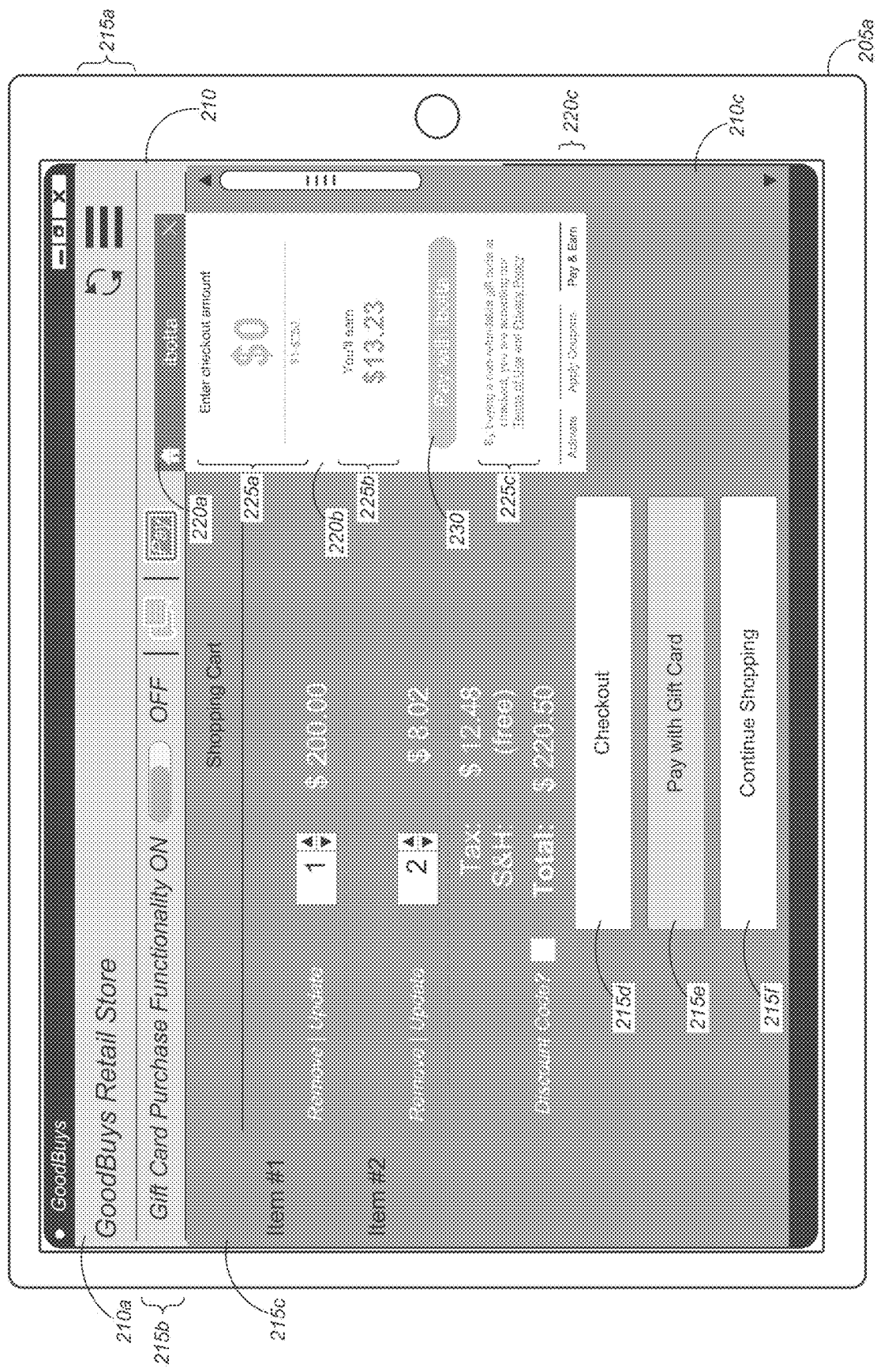
Figure 2H:
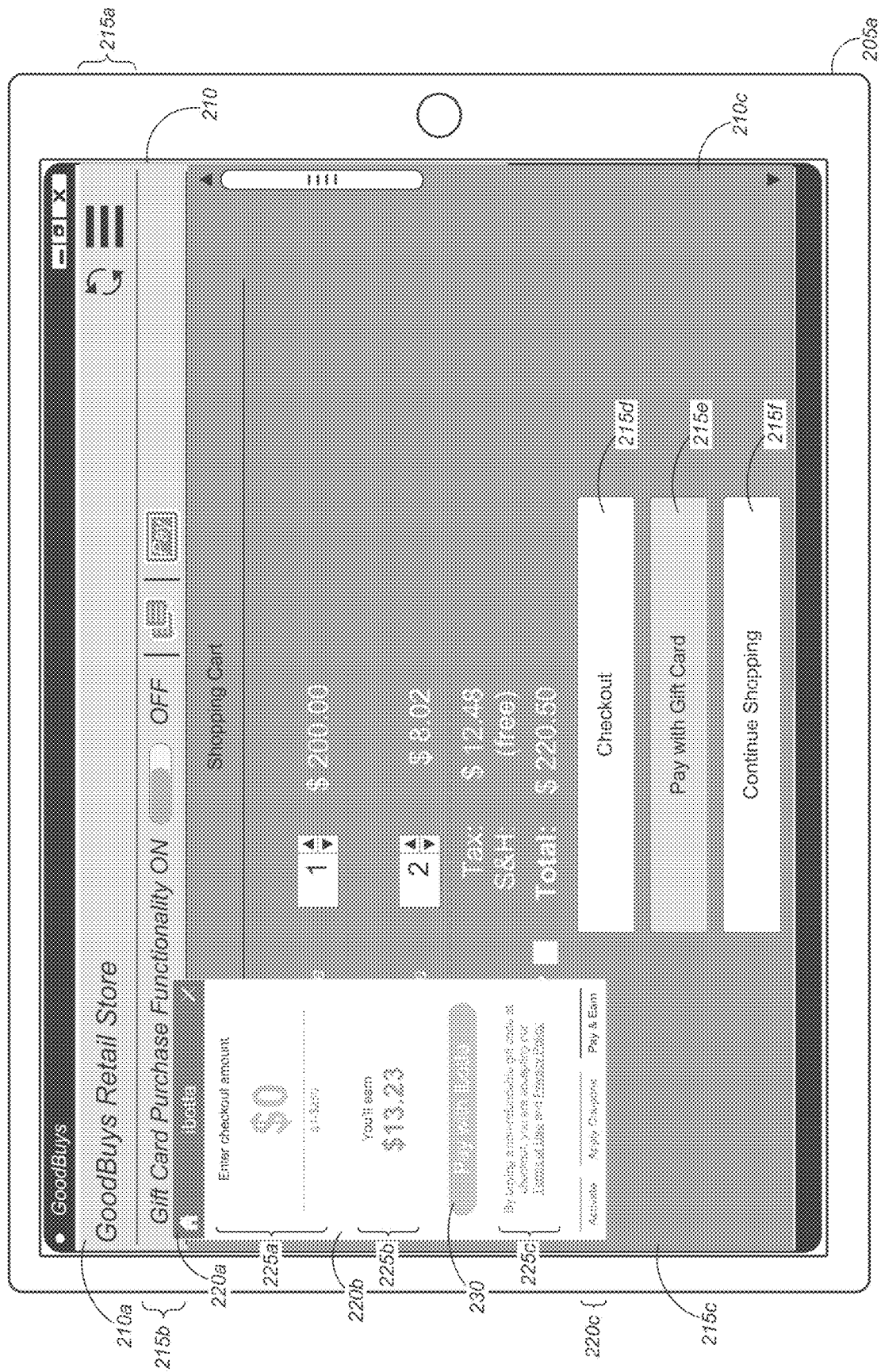
Figure 2I:
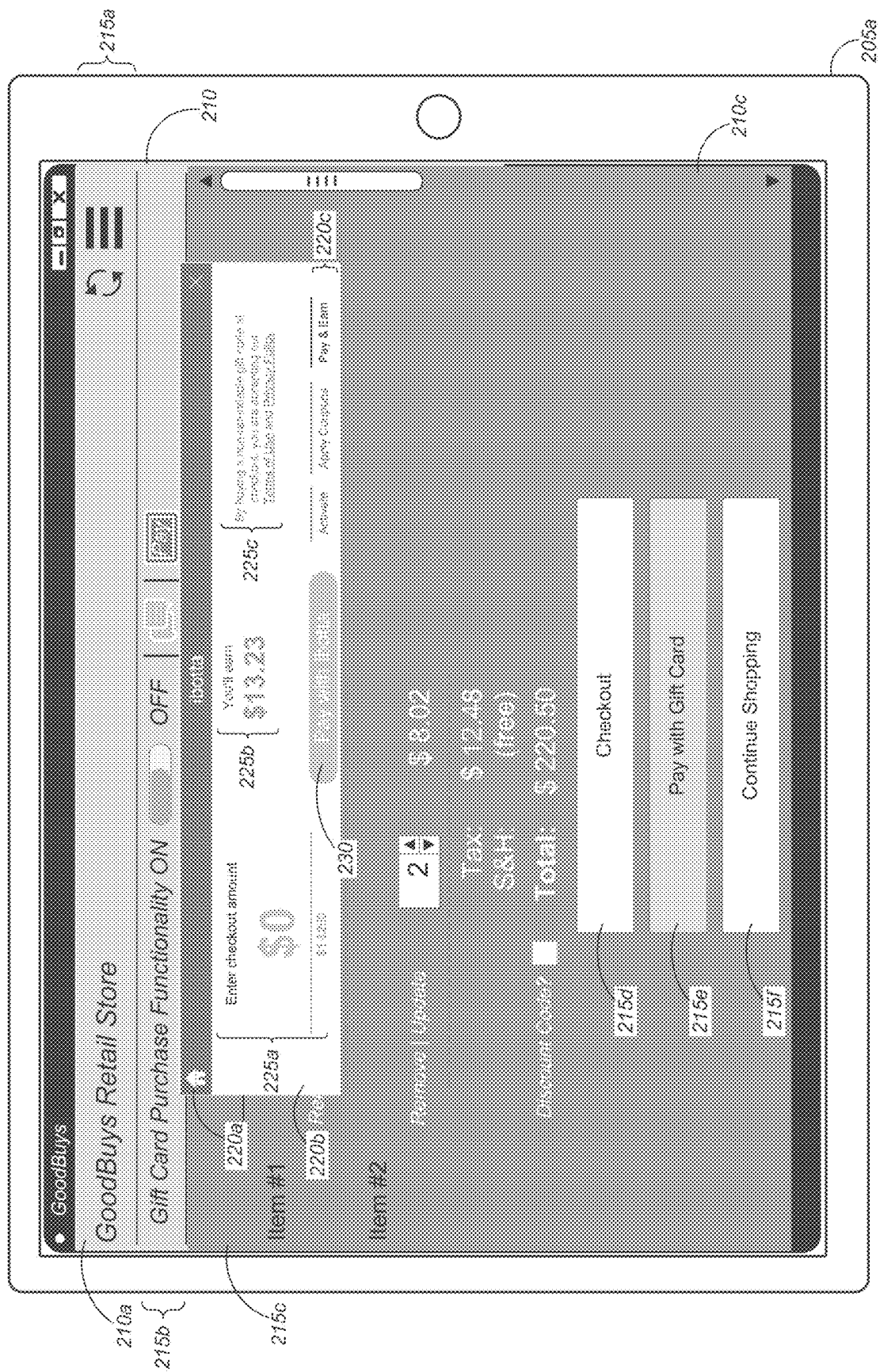
Figure 2J:
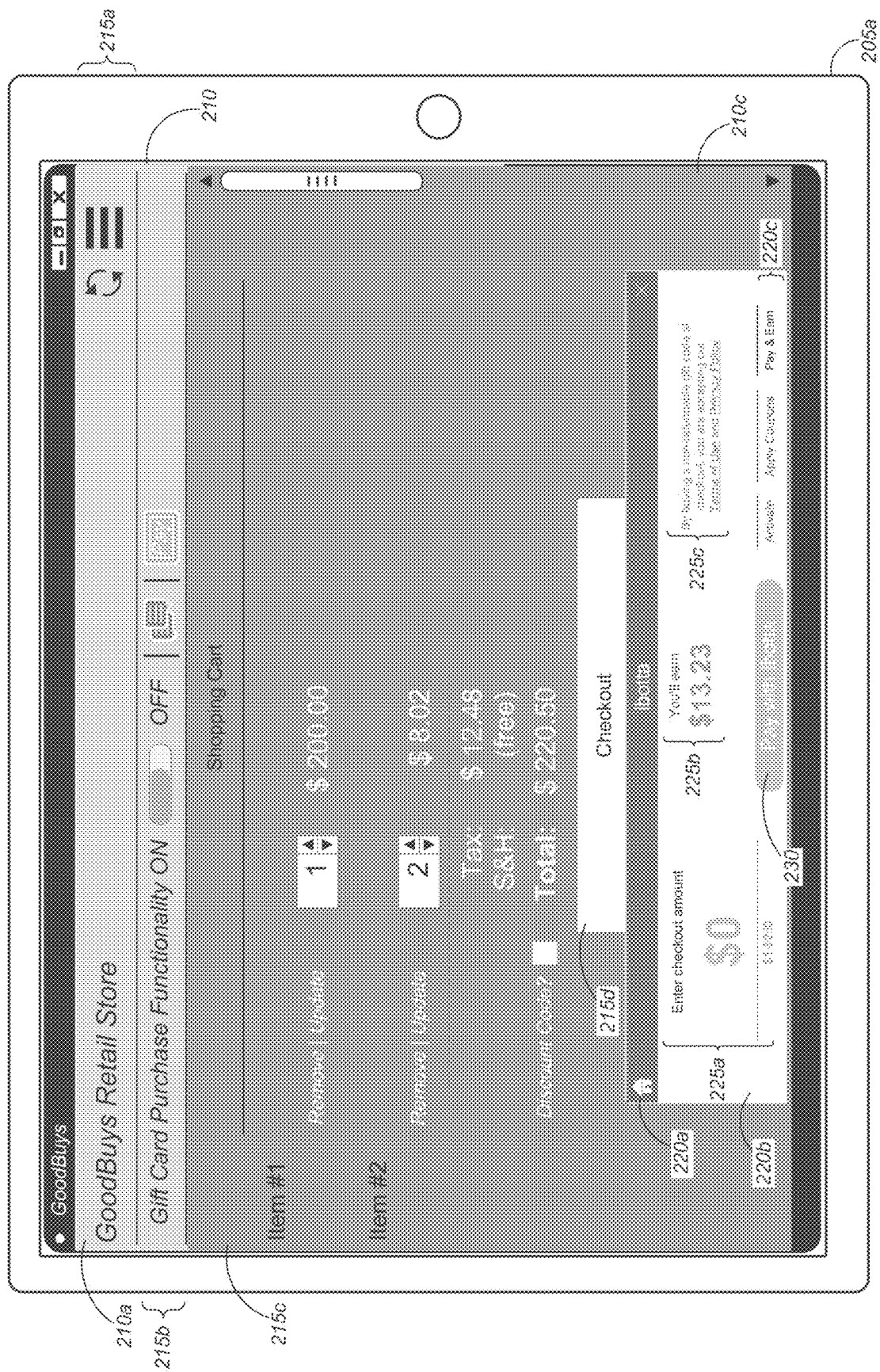
Figure 2K:
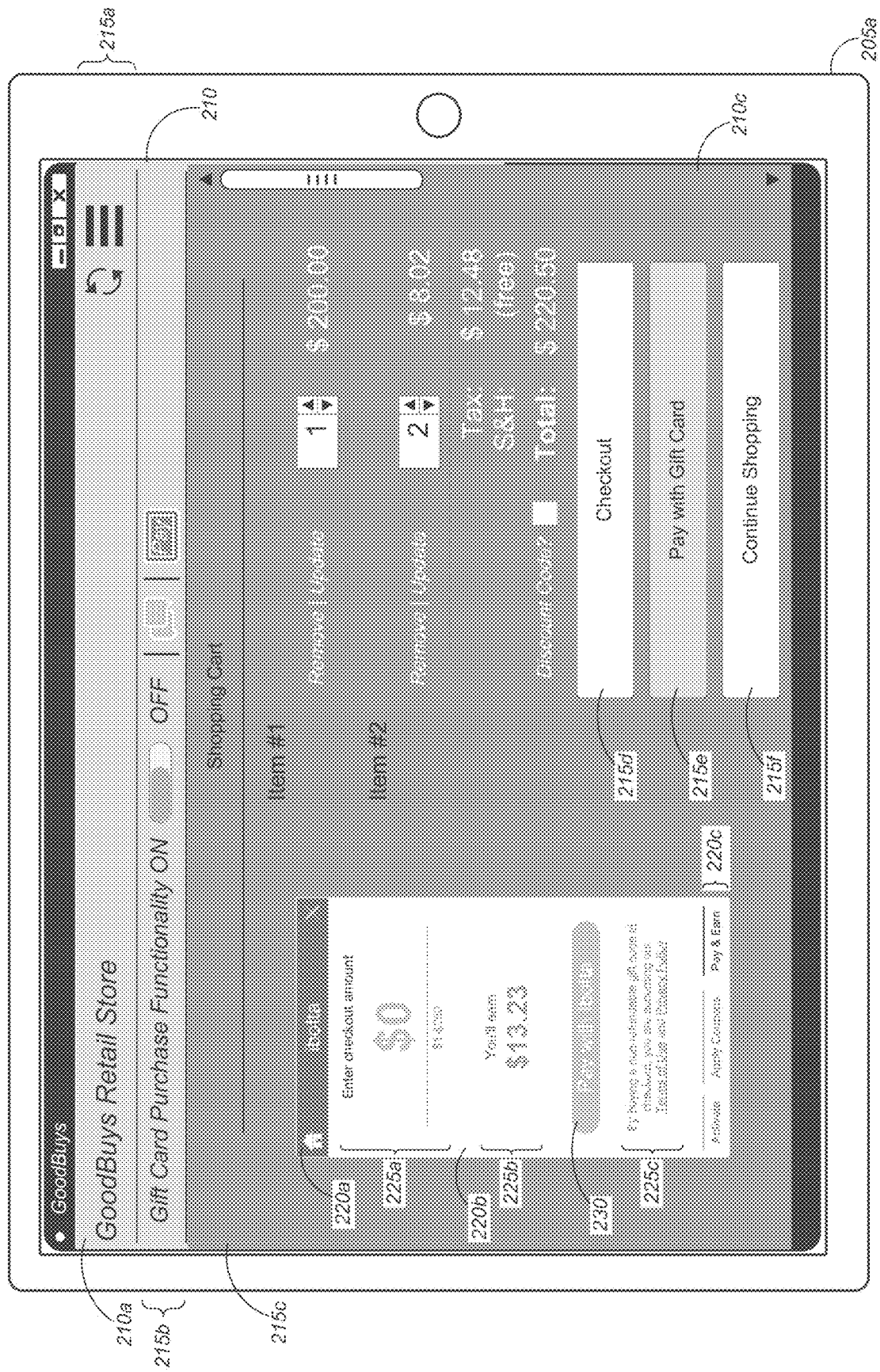

Whereas FIGS. 2A-2F depict various examples of the gift card purchase functionality as implemented using a software app running on the user device, FIGS. 2G-2K depict various examples of the gift card purchase functionality as implemented using a web portal, a custom browser, a mobile browser, or a browser with an appropriate browser plug-in, or the like. In particular, as shown in FIGS. 2G-2K, the gift card purchase screen 220 of FIG. 2B is shown overlaid in the retailer site as shown in FIG. 2A (e.g., as depicted in FIGS. 2G-2J) or is shown embedded within the retailer site as shown in FIG. 2A (e.g., as depicted in FIG. 2K). With reference to FIGS. 2G-2J, the gift card purchase screen overlay may be implemented as one of a right-side vertical overlay (as shown in FIG. 2G), a left-side vertical overlay (as shown in FIG. 2H), a top-portion horizontal overlay (as shown in FIG. 2I), a bottom-portion horizontal overlay (as shown in FIG. 2J), or a middle portion (not shown), or the like. Turning to FIG. 2K, the gift card purchase screen 220 may be embedded within the webpage of the retailer, where embedding the gift card purchase screen 220 comprises modifying the webpage of the retailer to shift display of the contents of the webpage (or to otherwise force the contents of the webpage to move around within the display of the webpage) to provide an area on the webpage in which the gift card purchase screen 220 may be embedded without obscuring the contents of the webpage. In a similar manner, according to some embodiments, the gift card purchase screen 220 may be overlaid over the webpage in a manner that avoids obscuring the contents of the webpage (as shown, e.g., in FIG. 2G) compared with such overlay that does obscure the contents of the webpage (as shown, e.g., in FIGS. 2H-2J), in some cases by assessing the contents or information as displayed on the webpage and determining how or where to overlay the gift card purchase screen 220 to avoid obscuring the contents of the webpage (in the case that such intent is desired or selected). Merely by way of example, whether the gift card purchase screen 220 is overlaid over or embedded within the webpage, in what relative position (e.g., right-side, left-side, top-portion, bottom-portion, middle portion, etc.), in what relative orientation (e.g., vertical, horizontal, etc.), or whether or not obscuring content, etc. may be performed as part of auto-positioning functionality of the gift card purchase functionality and/or may be performed depending on the retailer associated with the webpage being displayed in the display screen 210 of the user device 205.

FIGS. 2G-2K also depict the use of a tablet computer as the user device 205, as compared with the smart phone embodying the user device 205, as depicted in the examples of FIGS. 2A-2F. According to some embodiments, the gift card purchase functionality portion 215*b* might further provide the user with the option to enable notifications related to gift card purchase functionality (depicted in FIGS. 2H and 2J as highlighted notification icons, denoting selection of such functionality), to disable notifications related to gift card purchase functionality (depicted in FIGS. 2G, 2I, and 2K as grayed-out notification icons, denoting deselection of such functionality), to enable pay button generation functionality (depicted in FIGS. 2G-2I and 2K as highlighted pay button icons, denoting selection of such functionality), to disable pay button generation functionality (depicted in FIG. 2J as a grayed-out pay button icon, denoting deselection of such functionality), and/or the like. Although only the gift card purchase screen 220 of FIG. 2B is shown as the overlay or the embedded screen of FIGS. 2G-2K, this is merely for simplicity of illustration and the various embodiments are not so limited, and any of the gift card purchase screens 220 of FIGS. 2C-2E may be overlaid over or embedded within the screen of FIG. 2A (shown in FIGS. 2G-2K) or within the screen of FIG. 2F (not shown in FIGS. 2G-2K), or other screen of the webpage of the retailer (not shown in FIG. 2).

In some embodiments, the user might enable gift card purchase functionality by toggling the option 215*b* to the on-state prior to engaging in the shopping experience—which might enable functionalities including, but not limited to, modification of the retail site or retail app by generation of a "Pay with Gift Card" button, by generation and/or overlaying or embedding of the gift card purchase screen or other screens, and/or or the like—and might select "Pay with Gift Card" button 215*e* to complete the transaction. In alternative embodiments, the option 215*b* might be part of the software app, web portal, custom browser, a mobile browser, or browser plug-in that is implementing the gift card purchase functionality, rather than being displayed as a toggle option or the like as shown in FIGS. 2A and 2F-2K. In such embodiments, by simply using the gift card purchase functionality (whether as or using a software app, a web portal, a custom browser, a mobile browser, or a browser plug-in, or the like; perhaps without the user being aware of such option 215*b*), the gift card purchase functionality may be implemented, resulting in modification of the retail site or retail app by generation of a "Pay with Gift Card" button, by generation and/or overlaying or embedding of the gift card purchase screen or other screens, and/or or the like, that further results in completion of transaction when the user selects the generated "Pay with Gift Card" button 215*e* and following the subsequent steps (e.g., as shown in the gift card purchase screens or the like in FIGS. 2B-2E and 2G-2K, or the like). In some alternative embodiments, the implementation of the gift card purchase functionality may obscure to the user that a gift card is being purchased to pay for the items on the retail site, with such gift card purchase being purchased in the background and the user merely being aware that a third party service has been used by the user to pay for the items on the retail site (with the third party service being associated with a third party that is separate from and unaffiliated with the retailer associated with the retail site). The example 200 of FIG. 2 may otherwise be implemented as described above with respect to system 100 of FIG. 1.

FIGS. 3A-3K (collectively, "FIG. 3") are schematic diagrams illustrating another non-limiting example 300 of user interfaces of a user device depicting an example of gift card purchase screens of a service provider and an example of a shopping cart screen and a checkout screen of an online shopping system for which gift card purchase functionality has been implemented, in accordance with various embodiments.

As shown in the non-limiting example 300 of FIG. 3, the series of depicted user interfaces of the user device illustrate autonomous auto-filling by a computing system associated with a service provider of a checkout amount (e.g., a total amount due on the items being purchased by a user, which total amount may include a sum of amounts for each item, applicable taxes, and shipping and handling fees, or the like). In some embodiments, the computing system might assess at least one of content or information that is presented in at least one of a shopping cart page or a checkout page of a website associated with a retailer to determine the checkout amount. In some cases, the computing system associated with the service provider might calculate a credit amount that the user can earn by purchasing the checkout items (based on the autonomously auto-filled checkout amount) using a gift card purchased through the service provider. By selecting to pay the checkout items using the gift card, the user may be provided with a series of steps or screens to purchase the gift card using the user's credit card or debit card (or other payment options (e.g., PayPal, automated clearing house ("ACH") bank transfer, cryptocurrencies, or other forms of payment)). In some cases, a third party financial institution might handle the payment portion of the purchase of the gift card, thereby relieving the service provider of the need to store or otherwise be exposed to details of the user's payment methods (e.g., the user's credit card number, the user's debit card number, ACH bank transfer, etc.). Once the gift card has been purchased, the computing system might generate a gift card code and might autonomously auto-fill such gift card code within a portion of the at least one of the shopping cart page or the checkout page of the retailer from which the user is purchasing items (that add up to the checkout amount). After auto-filling the gift card code in the at least one of the shopping cart page or the checkout page (and perhaps after the user confirms purchase using the gift card), the transaction with the retailer would be complete. The balance remaining in the gift card after purchasing the items may be provided to the user as "user rewards" (which might include, without limitation, at least one of cash back, loyalty points, credit, or discounts, and/or the like). In some cases, the service provider might receive a commission as compensation for providing the gift card purchasing service, where the commission might come from a combination of gift card sale commissions, affiliate marketing commissions, and/or promotional codes used, and/or the like. Cash back to the user, for example, might be funded by sharing, with the user, a portion of the overall commission revenue that the service provider receives. Alternatively, the balance remaining in the gift card after purchasing the items may be provided to the user as a credit on further online purchases through the service provider.

Specifically, with reference to FIGS. 3A-3F, FIG. 3A depicts a non-limiting example of a user device 305 (which might include, without limitation, one of a tablet computer, a laptop computer, a desktop computer, a smart phone, a mobile phone, a gaming console, a portable gaming device, or a wearable device, and/or the like; in this case, a smart phone). According to some embodiments, the user device 305 might comprise a housing 305a, a display screen 310, and a retail or shopping software application ("app") 315 running on the user device 305 and being displayed on the display screen 310. Alternative to the app 315, a web portal (not shown), a browser plug-in for a browser (not shown), or a custom browser (not shown) may be implemented. In the non-limiting example of FIG. 3A, the display screen 310 might comprise a header portion 310a, a quick task portion 310b, and a main display portion 310c. In the header portion 310a might be displayed at least one of time of day, cellular communications signal strength icon, and/or wireless communications signal strength icon, or the like. In the quick task portion 310b might be displayed at least one of a main menu button, a back or undo button, a home button, a call button, a search button, and/or the like. In the main display portion 310c might be displayed the retail or shopping app 315, which might include, but is not limited to, at least one of an app header portion 315a (which might include, without limitation, at least one of an app title or retail store name, a refresh button, or a menu icon, and/or the like), a gift card purchase functionality option portion 315b (which might provide the user with the option to turn on or off automatic implementation of gift card purchase functionality (as described herein), or the like), a shopping cart screen 315c associated with the retailer, a checkout button 315d, a pay with gift card button 315e, and a continue shopping button 315f, and/or the like.

As depicted in FIG. 3A, the shopping cart screen 315c might comprise portions listing the items selected for purchase by the user (in this case, Item #1 and Item #2), the quantities for each item (with options to remove or update such quantities or items; in this example, one of Item #1 and two of Item #2), the price for each item (in this example, $200.00 for Item #1 and $8.02 for two of Item #2), the tax applicable on this purchase (in this example, $12.48, using a tax rate of 6%), the shipping and handling fees (in this example, $0 as shipping is free for this particular example order), a selection for whether or not to apply a discount code (which may include, but is not limited to, a promotion or promo code, a discount code, a gift card code, and/or the like), and the total purchase price on this order (in this example, $220.50). In the case that the user selects the pay with gift card button 315e, the user is taken to the webpage or app screens for the service provider providing gift card purchase functionality (in this case, Ibotta; although not limited to this particular service provider), as shown in FIG. 3B.

Turning to FIGS. 3B and 3C, in response to the user selecting to pay with a gift card, the display screen 310 might comprise gift card purchase app or screens 320, which might include, without limitation, a header portion 320a (which might include, but is not limited to, an gift card purchase app title or service provider name, a return home button, and a close button, or the like), a main display portion 320b, and a quick link portion 320c (which might include, but is not limited to, an activate link, a apply coupons link, and a pay & earn link, and/or the like). Within the main display portion 320b might be a checkout amount field 325a, a rewards field 325b, a message field 325c, and a pay with Ibotta button 330. The checkout amount field 325a might display a notification to the user that the system is auto-filling the checkout amount or the total purchase price of the items listed in the shopping cart or checkout page of the retailer site, with the input field being empty or loading (as depicted in FIG. 3B by the " . . . " or ellipsis symbol, or the like, although not limited to such symbol being displayed). The rewards field 325b might display the amount of credit or rewards that the user would earn for purchasing the items using the gift card. The message field 325c might display a message to the user (e.g., a legal message indicating that the user accepts the terms of use and privacy policy by buying a non-refundable gift code at checkout, or the like). The pay with Ibotta button 330, when selected, takes the user through the process of purchasing the gift card for the purpose of paying for the items on the retail shopping cart or checkout screen (e.g., as shown in FIG. 3A, or the like). FIG. 3B depicts the gift card purchase screens 320 before the checkout amount has been auto-filled, while FIG. 3C depicts the gift card purchase screens 320 after the checkout amount has been auto-filled (in this case, $220.50). In response to the checkout amount having been auto-filled, the grayed-out pay with Ibotta button 330 (shown in FIG. 3B) would become selectable by the user (shown in FIG. 3C).

With reference to FIG. 3D, after the checkout amount has been auto-filled, an apply Ibotta balance prompt field 325d may be displayed, which when selected (as depicted in FIG. 3D by a checked selection box) would apply the user's balance with the service provider (in this example, $232.75, or the like) and would charge the user a certain amount (in this case, the amount equal to the checkout amount or $220.50). Selecting the pay with Ibotta button 330 at this stage would result in the generation of a gift card code (as shown in FIG. 3E). Alternative to using the user's balance with the service provider, the user might be taken through a portal (which may or may not be a third party portal) that takes the user through steps to purchase the gift card (including entering the user's debit card information). Although not shown, alternative to paying for the gift card using a debit card, any suitable payment method may be used, including, but not limited to, payment using a credit card, payment using a gift card, payment using ACH bank transfer, payment using a cryptocurrency, payment using PayPal, etc.

Referring to FIG. 3E, the gift card purchase screens 320 might further comprise a gift card screen 320d, within which might include, but is not limited to, a gift card display field 335a, a pin number display field 335b, a submit feedback link 335c, and a done button 340. The gift card display field 335a might display the generated gift card code (in this example, "1234567898765432" or the like), with a notification to the user that the gift card code will be auto-filled at checkout of the retailer site. The pin number display field 335b might display a pin number associated with the gift card code, which the user may use to recover the gift card code if lost or forgotten. The submit feedback link 335c might include a link for the user to submit feedback regarding the gift card purchase app 320. After selecting done, the user may be taken to the checkout page of the retailer site, as shown in FIG. 3F.

Turning to FIG. 3F, the retail or shopping app 315 might comprise a checkout screen 345, which might include, but is not limited to, a summary checkout display field 345a, a discount code field 345b, a discount-adjusted total price field 345c, and a confirm button 350. The summary checkout display field 345a might display a summary of the items selected for purchase by the user (in this case, Item #1 and Item #2), the quantities for each item (with options to remove or update such quantities or items; in this example, one of Item #1 and two of Item #2), the price for each item (in this example, $200.00 for Item #1 and $8.02 for two of Item #2), the tax applicable on this purchase (in this example, $12.48, using a tax rate of 6%), the shipping and handling fees (in this example, $0 as shipping is free for this particular example order), and the total purchase price on this order prior to application of the discount code (in this example, $220.50). The discount code field 345b might display a field in which the user can select to enter a discount code, a promo code, or a gift card code, and/or the like (as depicted in FIG. 3F by the checked selection box beside the discount code prompt) or which might automatically be selected if the gift card auto-filling functionality has been enabled. The discount code field 345b might further display an input field in which the gift card code (as depicted in FIG. 3E) may be auto-filled by the computing system of the gift card service provider. The discount-adjusted total price field 345c might display the amount of discount applied by entry of the discount code (in this case, the gift card code) and the total amount owed after application of the discount code (in this case, $0 as the gift card value equals the checkout price or total purchase price). The confirm button 350, when selected by the user, confirms the purchase of the items using the gift card code.

Although not shown in FIG. 3, the gift card value that is purchased by the user through the screens shown in FIGS. 3C-3E might be a value that is greater than the checkout price or total purchase price (e.g., $225, $230, $240, $250, or any suitable value that is either anticipated by the computing system of the service provider, selectable or modifiable by the user, or the like). The balance remaining on the gift card after application to the checkout price or total purchase price may be provided to the user as user rewards (in which the service provider might receive a commission, or the like) or may be applied to future purchases by the user using the service provided by the service provider (which may be reflected in the user's balance with the service provider as depicted in FIG. 3D, or the like).

Figure 3G:
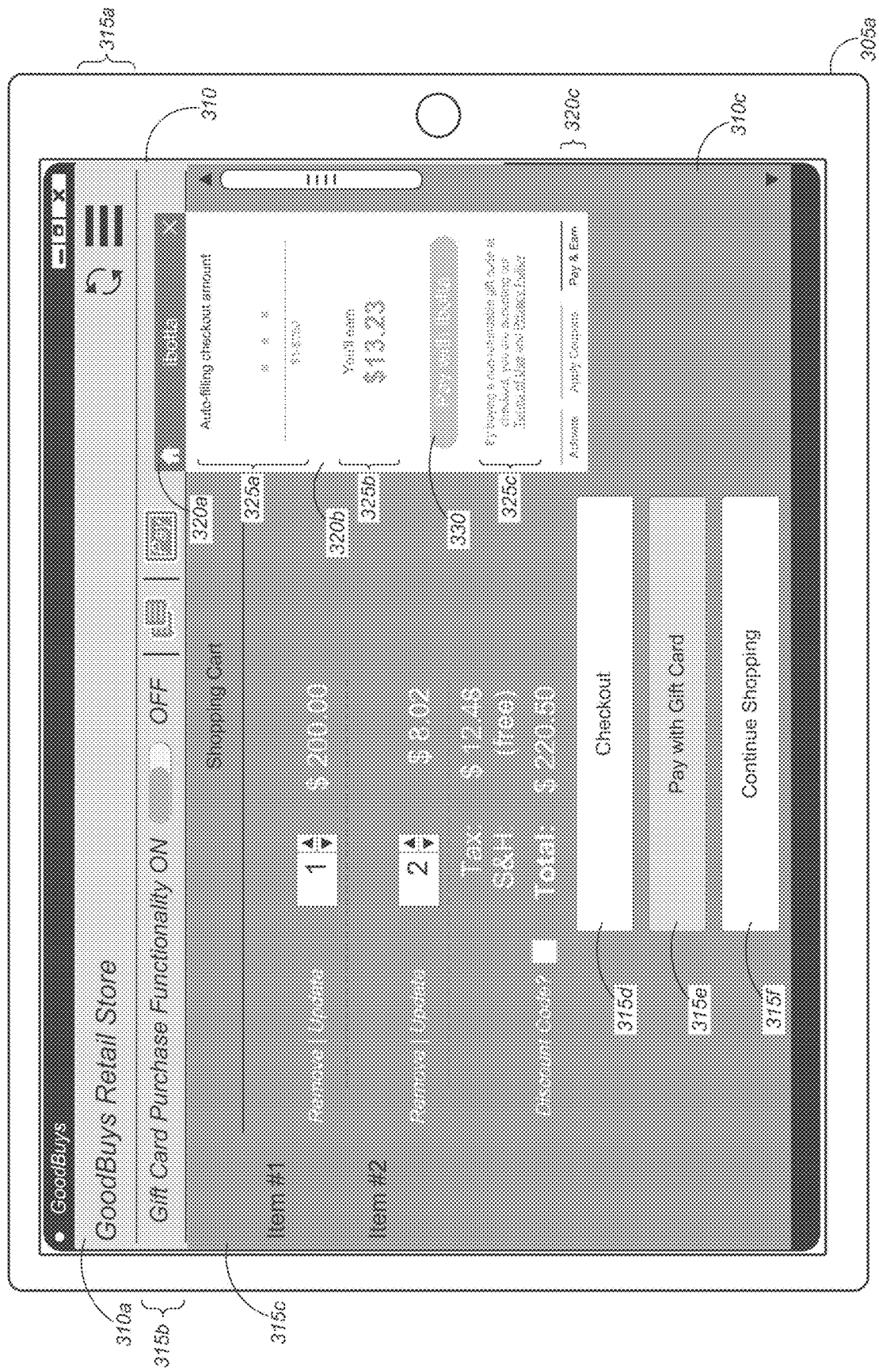
Figure 3H:
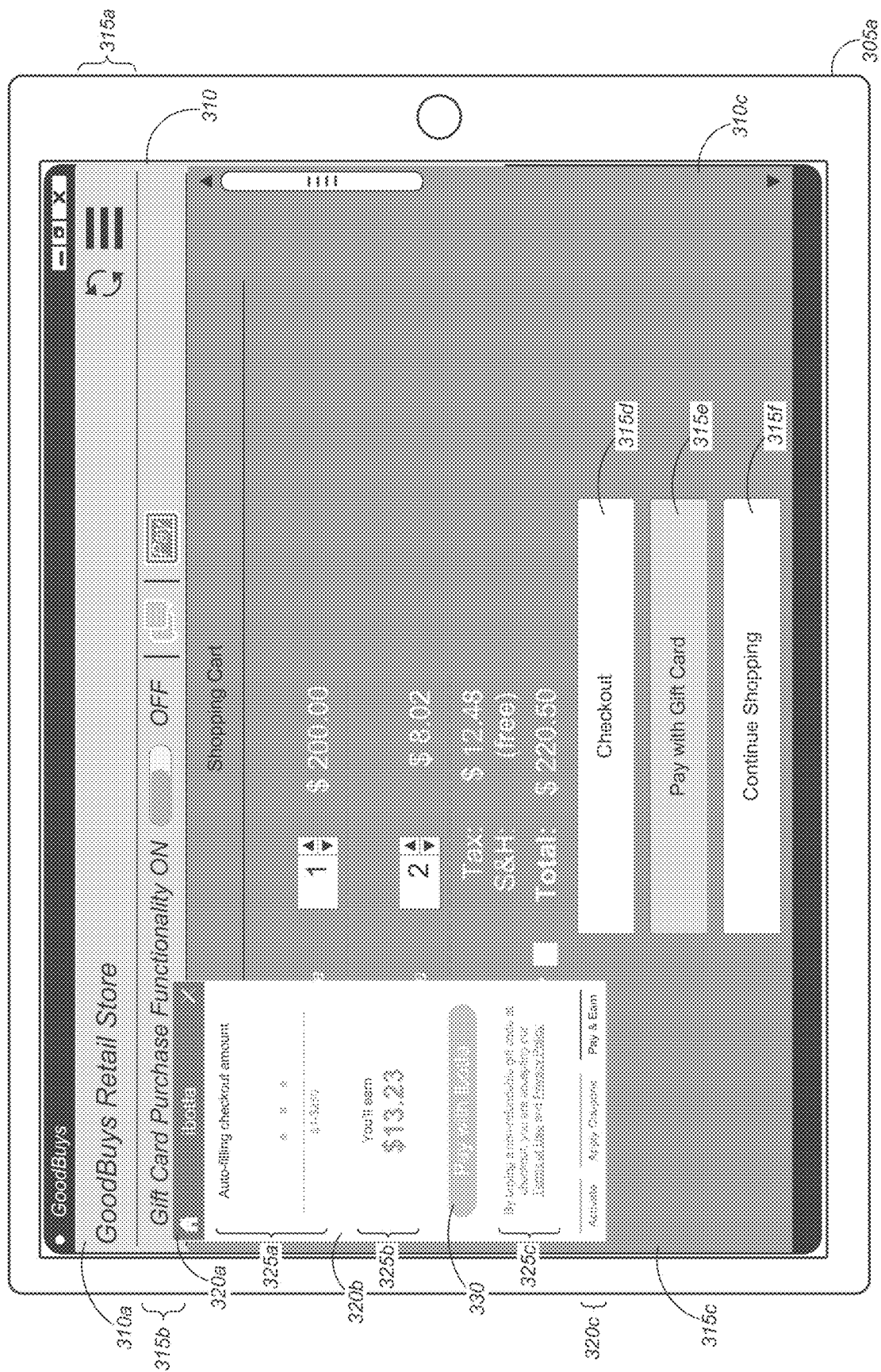
Figure 3I:
Figure 3J:
Figure 3K:
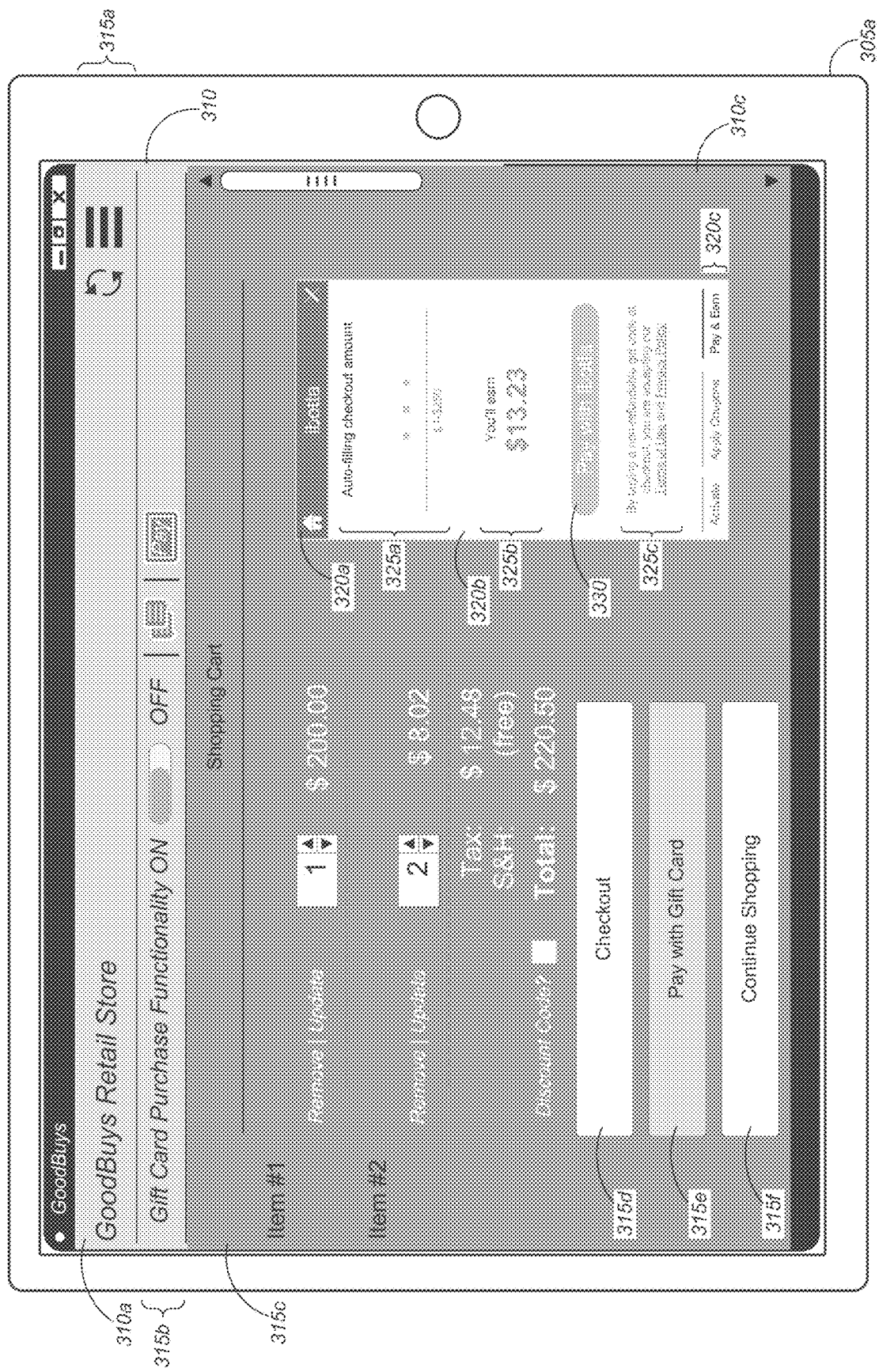

Whereas FIGS. 3A-3F depict various examples of the gift card purchase functionality as implemented using a software app running on the user device, FIGS. 3G-3K depict various examples of the gift card purchase functionality as implemented using a web portal, a custom browser, a mobile browser, or a browser with an appropriate browser plug-in, or the like. In particular, as shown in FIGS. 3G-3K, the gift card purchase screen 320 of FIG. 3B is shown overlaid in the retailer site as shown in FIG. 3A (e.g., as depicted in FIGS. 3G-3J) or is shown embedded within the retailer site as shown in FIG. 3A (e.g., as depicted in FIG. 3K). With reference to FIGS. 3G-3J, the gift card purchase screen overlay may be implemented as one of a right-side vertical overlay (as shown in FIG. 3G), a left-side vertical overlay (as shown in FIG. 3H), a top-portion horizontal overlay (as shown in FIG. 3I), a bottom-portion horizontal overlay (as shown in FIG. 3J), or a middle portion (not shown), or the like. Turning to FIG. 3K, the gift card purchase screen 320 may be embedded within the webpage of the retailer, where embedding the gift card purchase screen 320 comprises modifying the webpage of the retailer to shift display of the contents of the webpage (or to otherwise force the contents of the webpage to move around within the display of the webpage) to provide an area on the webpage in which the gift card purchase screen 320 may be embedded without obscuring the contents of the webpage. In a similar manner, according to some embodiments, the gift card purchase screen 320 may be overlaid over the webpage in a manner that avoids obscuring the contents of the webpage (as shown, e.g., in FIG. 3G) compared with such overlay that does obscure the contents of the webpage (as shown, e.g., in FIGS. 3H-3J), in some cases by assessing the contents or information as displayed on the webpage and determining how or where to overlay the gift card purchase screen 320 to avoid obscuring the contents of the webpage (in the case that such intent is desired or selected). Merely by way of example, whether the gift card purchase screen 320 is overlaid over or embedded within the webpage, in what relative position (e.g., right-side, left-side, top-portion, bottom-portion, middle portion, etc.), in what relative orientation (e.g., vertical, horizontal, etc.), or whether or not obscuring content, etc. may be performed as part of auto-positioning functionality of the gift card purchase functionality and/or may be performed depending on the retailer associated with the webpage being displayed in the display screen 310 of the user device 305.

FIGS. 3G-3K also depict the use of a tablet computer as the user device 305, as compared with the smart phone embodying the user device 305, as depicted in the examples of FIGS. 3A-3F. According to some embodiments, the gift card purchase functionality portion 315b might further provide the user with the option to enable notifications related to gift card purchase functionality (depicted in FIGS. 3G and 3K as highlighted notification icons, denoting selection of such functionality), to disable notifications related to gift card purchase functionality (depicted in FIGS. 3H-3J as grayed-out notification icons, denoting deselection of such functionality), to enable pay button generation functionality (depicted in FIGS. 3G-3I and 3K as highlighted pay button icons, denoting selection of such functionality), to disable pay button generation functionality (depicted in FIG. 3J as a grayed-out pay button icon, denoting deselection of such functionality), and/or the like. Although only the gift card purchase screen 320 of FIG. 3B is shown as the overlay or the embedded screen of FIGS. 3G-3K, this is merely for simplicity of illustration and the various embodiments are not so limited, and any of the gift card purchase screens 320 of FIGS. 3C-3E may be overlaid over or embedded within the screen of FIG. 3A (shown in FIGS. 3G-3K) or within the screen of FIG. 3F (not shown in FIGS. 3G-3K), or other screen of the webpage of the retailer (not shown in FIG. 3).

In some embodiments, the user might enable gift card purchase functionality by toggling the option 315b to the on-state prior to engaging in the shopping experience—which might enable functionalities including, but not limited to, modification of the retail site or retail app by generation of a "Pay with Gift Card" button, by generation and/or overlaying or embedding of the gift card purchase screen or other screens, and/or or the like—and might select "Pay with Gift Card" button 315e to complete the transaction. In alternative embodiments, the option 315b might be part of the software app, web portal, custom browser, a mobile browser, or browser plug-in that is implementing the gift card purchase functionality, rather than being displayed as a toggle option or the like as shown in FIGS. 3A and 3F-3K. In such embodiments, by simply using the gift card purchase functionality (whether as or using a software app, a web portal, a custom browser, a mobile browser, or a browser plug-in, or the like; perhaps without the user being aware of such option 315b), the gift card purchase functionality may be implemented, resulting in modification of the retail site or retail app by generation of a "Pay with Gift Card" button, by generation and/or overlaying or embedding of the gift card purchase screen or other screens, and/or or the like, that further results in completion of transaction when the user selects the generated "Pay with Gift Card" button 315e and following the subsequent steps (e.g., as shown in the gift card purchase screens or the like in FIGS. 3B-3E and 3G-3K, or the like). In some alternative embodiments, the implementation of the gift card purchase functionality may obscure to the user that a gift card is being purchased to pay for the items on the retail site, with such gift card purchase being purchased in the background and the user merely being aware that a third party service has been used by the user to pay for the items on the retail site (with the third party service being associated with a third party that is separate from and unaffiliated with the retailer associated with the retail site). The example 300 of FIG. 3 may otherwise be implemented as described above with respect to system 100 of FIG. 1.

Figure 4A:
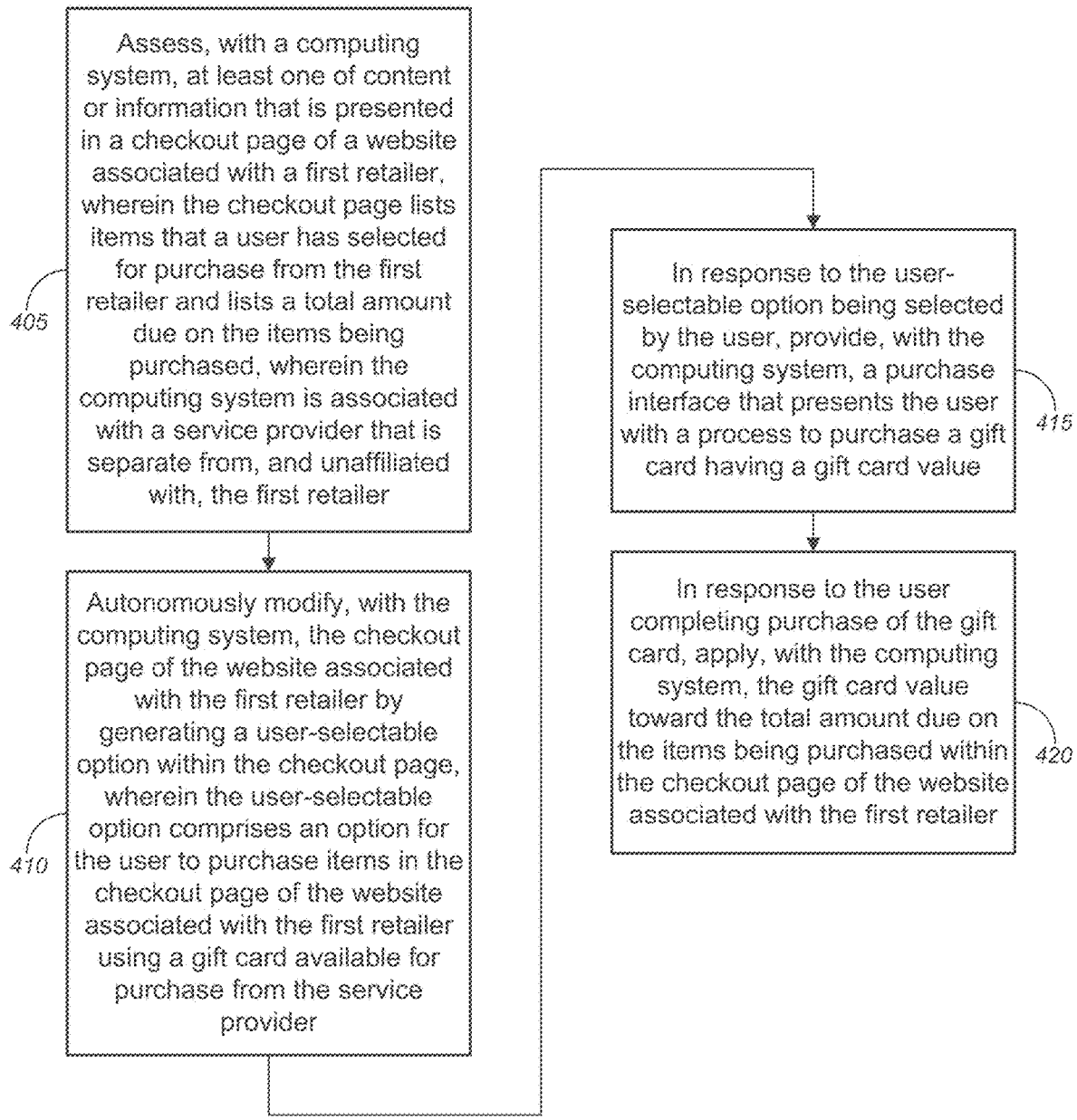
FIGS. 4A-4C are flow diagrams illustrating a method for implementing stored-value instrument purchase functionality (e.g., gift card purchase functionality, or the like) for online shopping systems, in accordance with various embodiments.
Figure 4B:
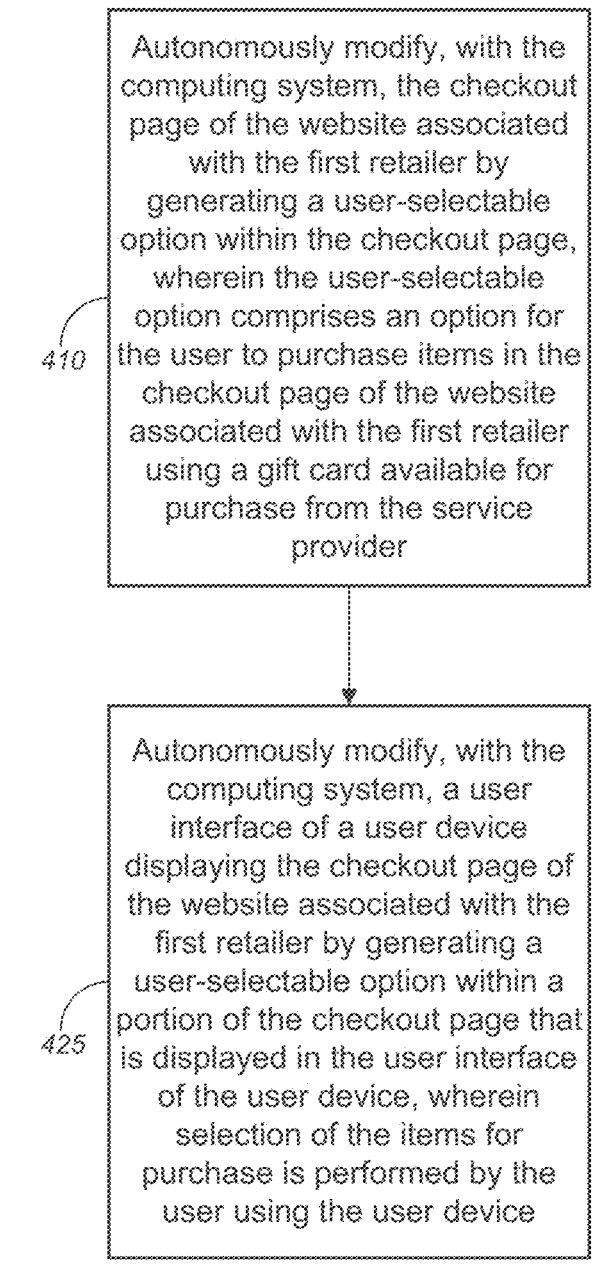
Figure 4C:
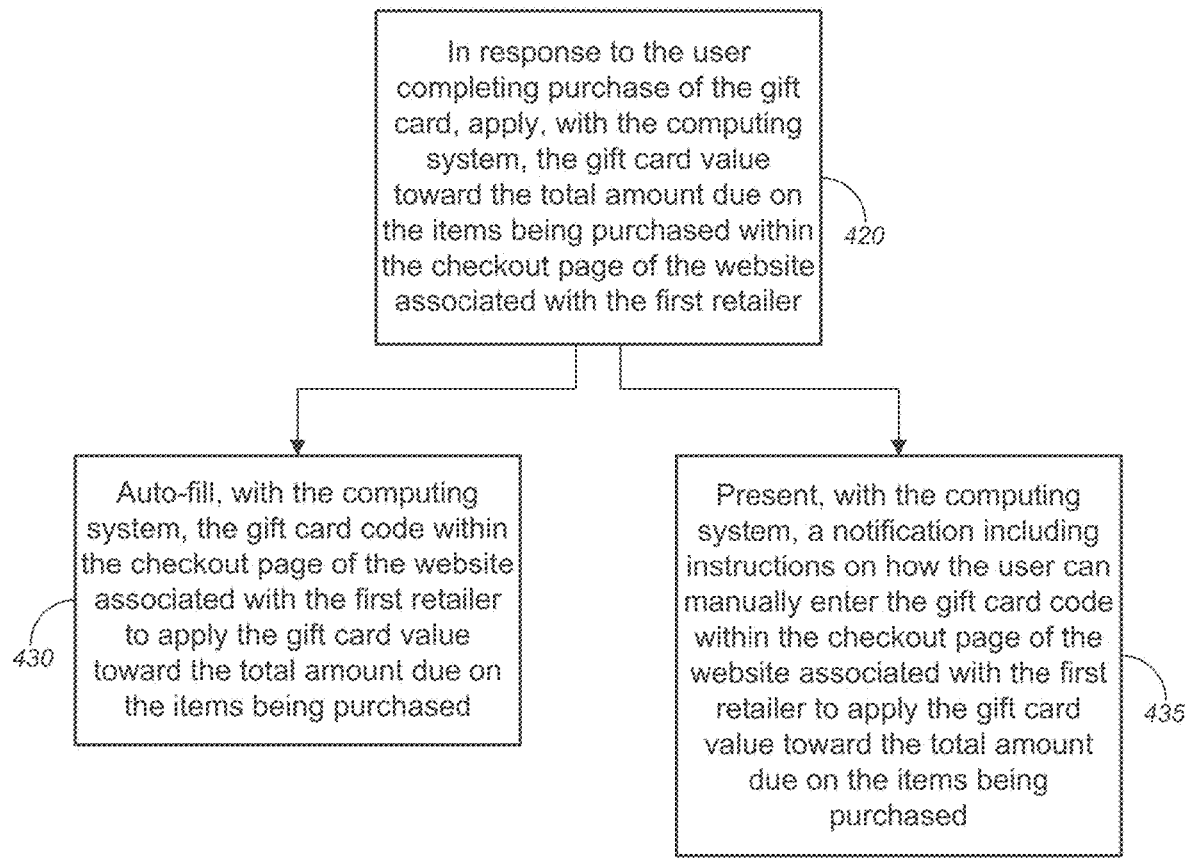

FIGS. 4A-4C (collectively, "FIG. 4") are flow diagrams illustrating a method 400 for implementing stored-value instrument purchase functionality (e.g., gift card purchase functionality, or the like) for online shopping systems, in accordance with various embodiments.

While the techniques and procedures are depicted and/or described in a certain order for purposes of illustration, it should be appreciated that certain procedures may be reordered and/or omitted within the scope of various embodiments. Moreover, while the method 400 illustrated by FIG. 4 can be implemented by or with (and, in some cases, are described below with respect to) the systems, examples, or embodiments 100, 200, and 300 of FIGS. 1, 2, and 3, respectively (or components thereof), such methods may also be implemented using any suitable hardware (or software) implementation. Similarly, while each of the systems, examples, or embodiments 100, 200, and 300 of FIGS. 1, 2, and 3, respectively (or components thereof), can operate according to the method 400 illustrated by FIG. 4 (e.g., by executing instructions embodied on a computer readable medium), the systems, examples, or embodiments 100, 200, and 300 of FIGS. 1, 2, and 3 can each also operate according to other modes of operation and/or perform other suitable procedures.

In the non-limiting embodiment of FIG. 4A, method 400, at block 405, might comprise assessing, with a computing system, at least one of content or information that is presented in at least one of a shopping cart page or a checkout page of a website associated with a first retailer, wherein the at least one of the shopping cart page or the checkout page lists items that a user has selected for purchase from the first retailer and lists a total amount due on the items being purchased, wherein the computing system is associated with a service provider that is separate from, and unaffiliated with, the first retailer. In some embodiments, the computing system might include, without limitation, a processor of the user device running a software application ("app"), a server computer over a network, a cloud-based computing system over a network, or a distributed computing system, and/or the like.

At block 410, method 400 might comprise autonomously modifying, with the computing system, the at least one of the shopping cart page or the checkout page of the website associated with the first retailer by generating a user-selectable option within the at least one of the shopping cart page or the checkout page, wherein the user-selectable option comprises an option for the user to purchase items in the at least one of the shopping cart page or the checkout page of the website associated with the first retailer using a gift card available for purchase from the service provider. According to some embodiments, the modification of the at least one of the shopping cart page or the checkout page of the web site may be implemented using one of a browser plug-in, a custom browser, a mobile browser, or a software app associated with the service provider, and/or the like.

Method 400 might further comprise, at block 415, in response to the user-selectable option being selected by the user, providing, with the computing system, a purchase interface that presents the user with a process to purchase a gift card having a gift card value. Method 400 might further comprise, in response to the user completing purchase of the gift card, applying, with the computing system, the gift card value toward the total amount due on the items being purchased within the at least one of the shopping cart page or the checkout page of the website associated with the first retailer (block 420). In the case that the gift card value is greater than the total amount due on the items being purchased within the at least one of the shopping cart page or the checkout page of the website associated with the first retailer, the remaining balance on the gift card may either be returned to the user as cash back (in some cases, with commissions being provided to the service provider from the cash back amount). Alternatively, in the case that the gift card value is less than the total amount due on the items being purchased within the at least one of the shopping cart page or the checkout page of the website associated with the first retailer, in response to the user completing purchase of the gift card, the computing system might apply the gift card value toward the total amount due on the items being purchased within the at least one of the shopping cart page or the checkout page of the web site associated with the first retailer, with the computing system presenting the user with payment options for payment of the remaining balance on the total amount due on the items being purchased within the at least one of the shopping cart page or the checkout page of the website associated with the first retailer.

In some embodiments, the total amount due on the items being purchased might include, but is not limited to, a sum of amounts for each item, applicable taxes, and shipping and handling fees, and/or the like. In some cases, the gift card might have a gift card value greater than the total amount due on the items being purchased, where a balance on the gift card after application of the gift card value to the total amount due on the items being purchased might be provided to the user as "user rewards" (which might include, without limitation, at least one of cash back, loyalty points, credit, or discounts, and/or the like). In some instances, the gift card might have a gift card value greater than the total amount due on the items being purchased, where a balance on the gift card after application of the gift card value to the total amount due on the items being purchased might be provided as credit to the user for future online purchases through the service provider.

Merely by way of example, in some cases, assessing the at least one of content or information that is presented in the at least one of the shopping cart page or the checkout page of the website associated with the first retailer might comprise assessing the at least one of content or information that is presented in the at least one of the shopping cart page or the checkout page of the website associated with the first retailer using artificial intelligence ("AI") systems or machine learning systems.

With reference to FIG. 4B, autonomously modifying the at least one of the shopping cart page or the checkout page of the website associated with the first retailer by generating the user-selectable option within the at least one of the shopping cart page or the checkout page (at block 410) might comprise autonomously modifying, with the computing system, a user interface of a user device displaying the at least one of the shopping cart page or the checkout page of the website associated with the first retailer by generating a user-selectable option within a portion of the at least one of the shopping cart page or the checkout page that is displayed in the user interface of the user device, wherein selection of the items for purchase might be performed by the user using the user device (block 425).

Turning to FIG. 4C, completion of the purchase of the gift card might result in a gift card code being presented to the user, where applying the gift card value toward the total amount due on the items being purchased (at block 420) might comprise autonomously auto-filling, with the computing system, the gift card code within the at least one of the shopping cart page or the checkout page of the website associated with the first retailer to apply the gift card value toward the total amount due on the items being purchased (block 430). Alternatively, completion of the purchase of the gift card might result in a gift card code being presented to the user and a notification being presented to the user, wherein applying the gift card value toward the total amount due on the items being purchased (at block 420) might comprise presenting, with the computing system, the notification, which includes instructions on how the user can manually enter (or copy and paste) the gift card code within the at least one of the shopping cart page or the checkout page of the website associated with the first retailer to apply the gift card value toward the total amount due on the items being purchased (block 435). Alternative to auto-filling the gift card code or having the user copy and paste (or manually enter) the gift card code, the computing system might copy the gift card code to the system clipboard and might provide a notification to the user regarding how and where to paste the gift card code (in particular, where the auto-fill functionality is disabled or unsupported, for example).

FIGS. 5A-5F (collectively, "FIG. 5") are schematic diagrams illustrating a non-limiting example 500 of user interfaces of a user device depicting an example of a shopping cart screen and a checkout screen of an online shopping system for which embedded checkout system functionality has been implemented, in accordance with various embodiments.

As shown in the non-limiting example 500 of FIG. 5, the series of depicted user interfaces of the user device 505 illustrate embedding of functionalities (including, but not limited to, gift card payment functionality, discount code searching functionality, user information auto-filling functionality, etc.) within a shopping cart or checkout page of a retailer site.

Specifically, with reference to FIGS. 5A-5F, FIG. 5A depicts a non-limiting example of a user device 505 (which might include, without limitation, one of a tablet computer, a laptop computer, a desktop computer, a smart phone, a mobile phone, a gaming console, a portable gaming device, or a wearable device, and/or the like; in this case, a smart phone). According to some embodiments, the user device 505 might comprise a housing 505a, a display screen 510, and a retail or shopping software application ("app") 515 running on the user device 505 and being displayed on the display screen 510. Alternative to the app 515, a web portal (not shown), a browser plug-in for a browser (not shown), or a custom browser (not shown) may be implemented. In the non-limiting example of FIG. 5A, the display screen 510 might comprise a header portion 510a, a quick task portion 510b, and a main display portion 510c. In the header portion 510a might be displayed at least one of time of day, cellular communications signal strength icon, and/or wireless communications signal strength icon, or the like. In the quick task portion 510b might be displayed at least one of a main menu button, a back or undo button, a home button, a call button, a search button, and/or the like. In the main display portion 510c might be displayed the retail or shopping app 515, which might include, but is not limited to, at least one of an app header portion 515a (which might include, without limitation, at least one of an app title or retail store name, a refresh button, or a menu icon, and/or the like), a gift card purchase functionality option portion 515b (which might provide the user with the option to turn on or off automatic implementation of gift card purchase functionality (as described herein), or the like), a shopping cart screen 515c associated with the retailer, a checkout button 515d, and a continue shopping button 515e, and/or the like.

As depicted in FIG. 5A, the shopping cart screen 515c might comprise portions listing the items selected for purchase by the user (in this case, Item #1 and Item #2), the quantities for each item (with options to remove or update such quantities or items; in this example, one of Item #1 and two of Item #2), the price for each item (in this example, $200.00 for Item #1 and $8.02 for two of Item #2), the tax applicable on this purchase (in this example, $12.48, using a tax rate of 6%), the shipping and handling fees (in this example, $0 as shipping is free for this particular example order), a selection for whether or not to apply a discount code (which may include, but is not limited to, a promotion or promo code, a discount code, a gift card code, and/or the like), and the total purchase price on this order (in this example, $220.50). As shown in FIG. 5A, the gift card purchase functionality option portion 515b is set to the OFF state.

Figure 6A:
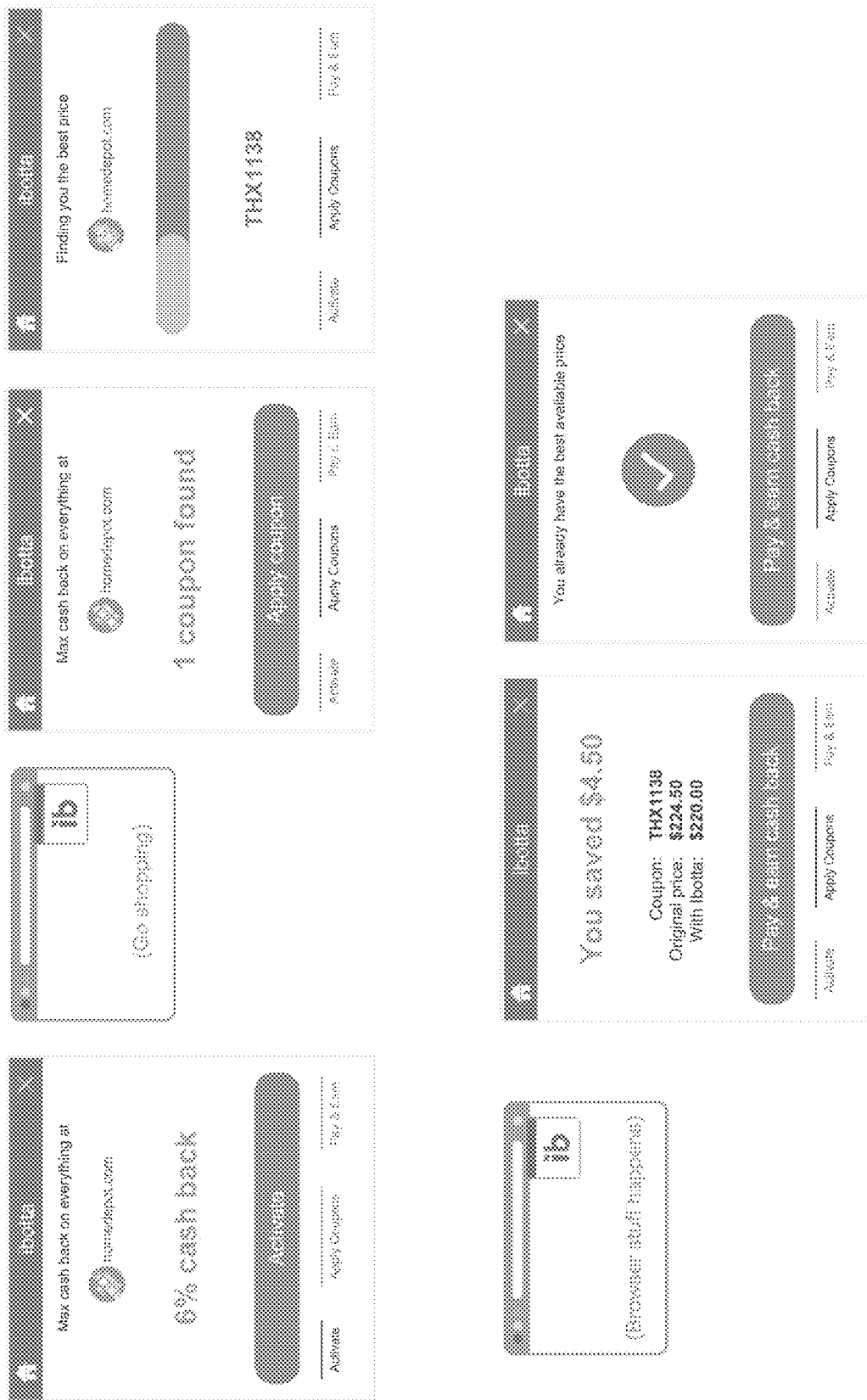

With reference to FIGS. 5B and 5C, the gift card purchase functionality option portion 515b is set to the ON state. By setting the gift card purchase functionality option portion 515b to the ON state, a computing system of the service provider (e.g., computing system 105 of FIG. 1, or the like) might autonomously modify the shopping cart or checkout page of the retailer site by embedding or generating one or more buttons that correspond to one or more functionalities, including, but not limited to, gift card payment functionality (e.g., with a pay with gift card button 515f, as depicted in FIG. 5B, or the like), discount code searching functionality (e.g., with a find discount codes button 515g, as depicted in FIG. 5C, or the like), etc. In response to the user selecting the pay with gift card button 515f (in FIG. 5B), the gift card purchase functionality may be implemented, including, but not limited to, the functionalities as described with respect to FIGS. 2 and 3, or the like. In response to the user selecting the find discount codes button 515g (in FIG. 5C), discount code search (and/or validation) functionality may be implemented, including, but not limited to, the functionalities as depicted in FIG. 6A, or the like.

As depicted in FIG. 5D, a billing information screen 520a might comprise portions listing the name and address of the user, as well as the payment information of the user (e.g., credit card information (shown in FIG. 5D), debit card information (not shown), ACH bank transfer information (not shown), cryptocurrency payment information (not shown), PayPal payment account information (not shown), etc.). The billing information screen 520a might further comprise a continue to checkout button 520b, which when selected results in the checkout page being displayed. As shown in FIG. 5D, the gift card purchase functionality option portion 515b is set to the OFF state.

With reference to FIGS. 5E and 5F, the gift card purchase functionality option portion 515b is set to the ON state. By setting the gift card purchase functionality option portion 515b to the ON state, a computing system of the service provider (e.g., computing system 105 of FIG. 1, or the like) might autonomously modify the billing information page of the retailer site by embedding or generating one or more buttons that correspond to one or more functionalities, including, but not limited to, user information auto-filling functionality (e.g., with an auto-fill user information button 520c, as depicted in FIG. 5B, or the like), etc. In response to the user selecting the auto-fill user information button 520c (in FIG. 5E), the billing information would be auto-filled as shown in FIG. 5F, in which the name of the user, the address of the user, and the payment information are depicted as being auto-filled by the computing system.

FIGS. 6A-6F (collectively, "FIG. 6") are schematic diagrams illustrating a non-limiting example 600 of user interfaces depicting an example of coupon activation and application screens of a service provider, an example of gift card purchase screens of the service provider, an example of ratings screens and suggested retailers and sales screens of the service provider, an example of account information screens of the service provider, an example of account creation and log-in screens of the service provider, and an example of search result and retailer result screens for which gift card purchase functionality has been implemented, in accordance with various embodiments.

With reference to FIG. 6A, an app associated with the service provider (e.g., service provider 115 of FIG. 1, or the like) might present the user with an incentive for cash back (e.g., 6% cash back, etc.) if the user activates coupon search and validation functionality. After the user activates coupon search and validation functionality by selecting an activate button, the user can proceed with online shopping. A computing system associated with the service provider might find a coupon. In response to the user selecting an apply coupon button, the computing system might display a coupon code, might display the amount of savings that the coupon has afforded the user as well as the original price of an item and the total price after applying the coupon, and might display a pay & earn cash back button.

Figure 6B:
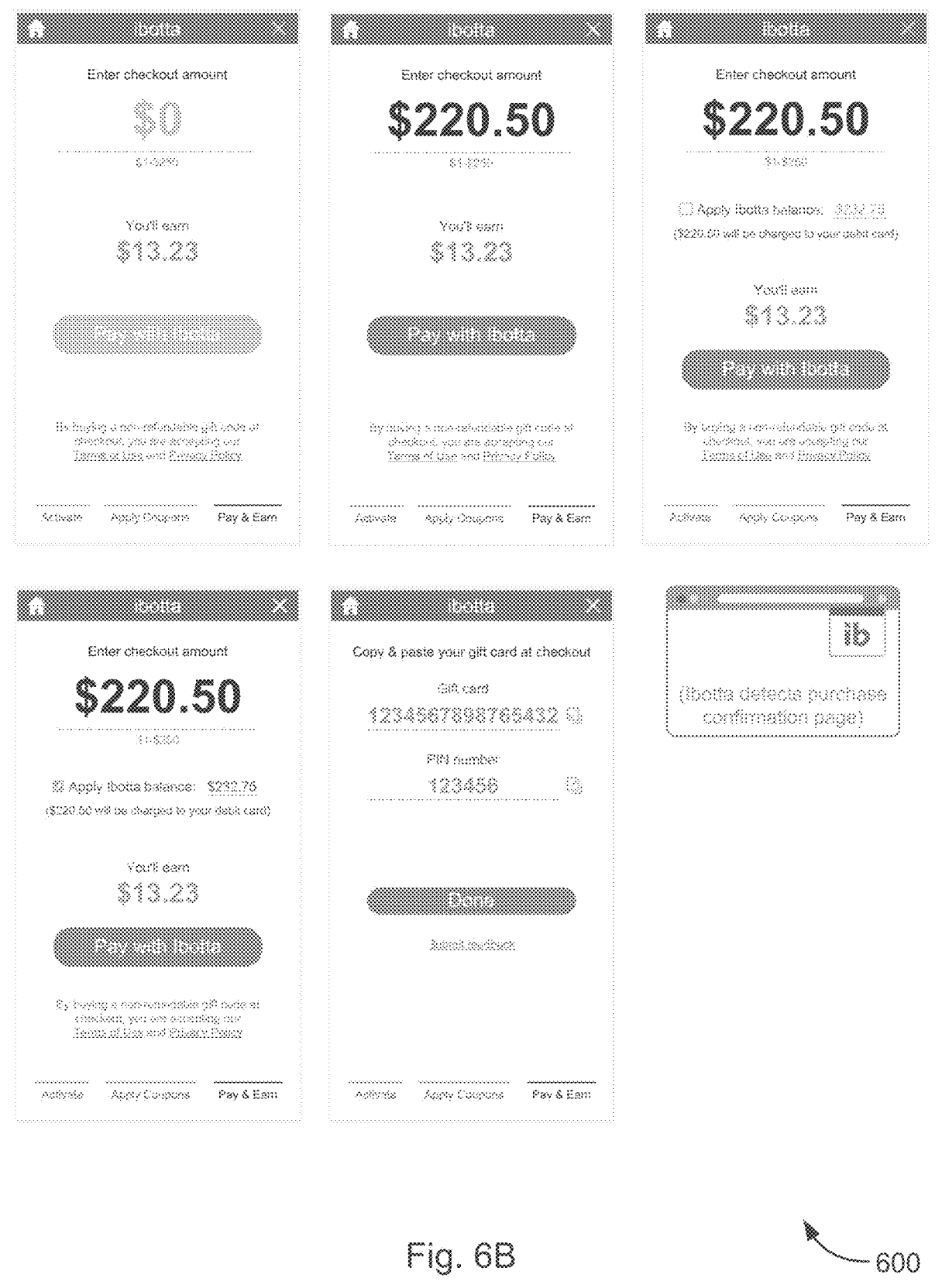

FIG. 6B might depict an embodiment similar to the embodiment of FIG. 2, as described in detail above. In particular, in response to a user manually entering a checkout amount (e.g., in response to the user selecting the pay & earn cash back button in FIG. 6A), the user might be presented with an option to apply a balance that the user has with the service provider. In response to the user selecting the option to apply the balance that the user has with the service provider, and in response to the user selecting to pay with the gift card, the computing system of the service provider might generate a gift card code and a PIN number as well as a notification indicating that the user can copy and paste the gift card code within the checkout page of a retailer site. In response to the user selecting the done button, the computing system might detect the purchase confirmation page.

Figure 6C:
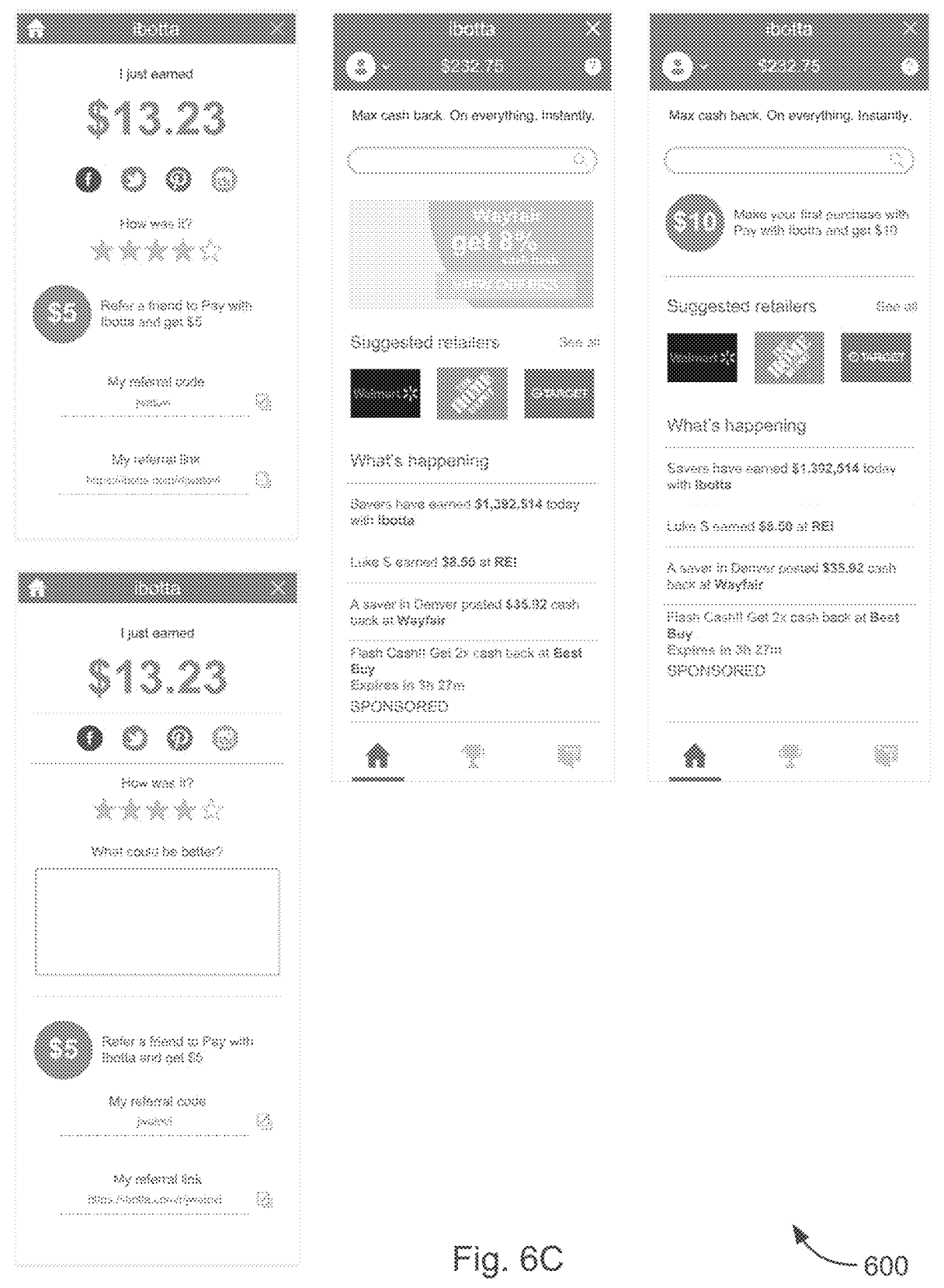

FIG. 6C might display a page indicating the amount of credit that the user has earned, presenting a rating field (in which the user may rate the service provider app and/or service, and/or may provide comments if the rating is at or below a certain amount), and displaying a friend referral option with incentive to refer a friend to pay with the services offered by the service provider. The computing system might compile and present a list of suggested retailers as well as money or credits earned by other players using the service offered by the service provider (e.g., in response to the user searching for items, classes or types of items (e.g., product category, etc.), or retailers, etc.). Incentives may be provided for the user to use the service. In some cases, the list of suggested retailers might take into account user purchase history with one or more retailers (perhaps indicative of consumer confidence or loyalty, etc.), might take into account purchase history of known or associated friends and family members, or might take into account previous user reviews and ratings for items or retailers, etc. In some embodiments, the computing system might autonomously determine whether the identified item(s) is on sale (for each retailer). According to some embodiments, the computing system might present the user with a (ranked) list of retailers selling the identified item(s), together with sale prices, relevance to items searched by user, etc. Additionally, or optionally, autonomously searching for discount and promotional or promo codes for the identified retailers and/or identified items, and presenting such information in the (ranked) list. In some cases, the computing system might provide a button, that when selected by the user, results in sort the (ranked) list by relevance, listed sale price, discounted sale price (after discount or promo codes have been applied), etc. These could also take into account shipping and handling fees, taxes, etc. Optionally, the computing system might provide comparison of technical specifications, ratings, reviews, costs, etc., for similar items compared with the searched items.

Figure 6D:
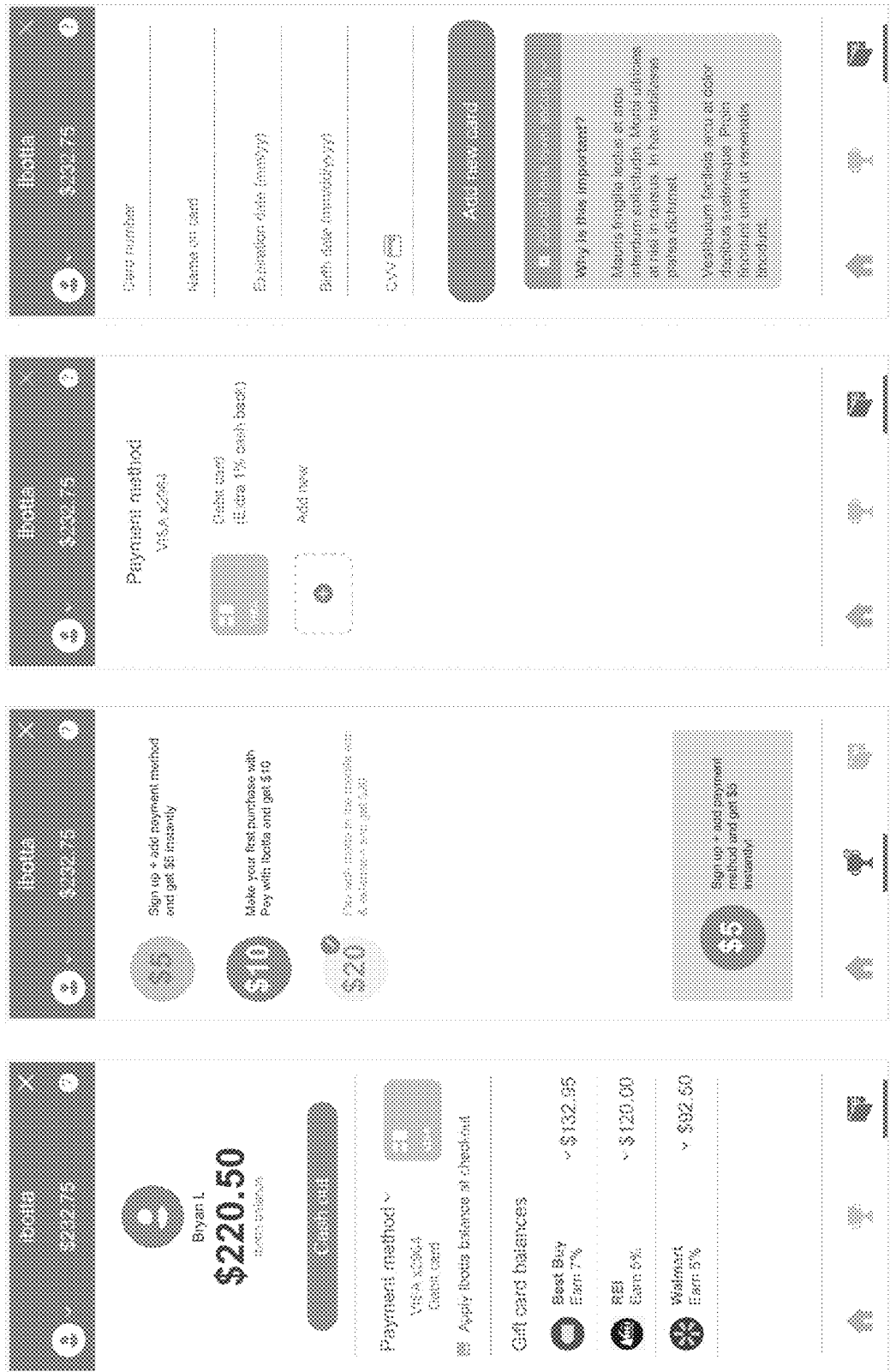

FIG. 6D might display a virtual wallet of the user, which might display the balance that the user has with the service provider, might include payment information of the user as stored in the system of the service provider, might include an option to apply the balance at retailer checkout pages, might include a cash out option, and might include gift card balances with particular retailers along with percentage or amount earned by the user for each retailer, etc. In some cases, the computing system might provide lists of retailers for which the user has previously bought credit (e.g., gift cards to purchase items, etc.), might provide lists of items purchased using gift cards, might provide summary of cash back for each purchased gift card (perhaps together with retailer, date, etc.), might check balances on gift cards (which may be obtained from card balances directly, may be obtained from retailers directly, may be inferred from user behavior, or may be inferred from shopping histories of the user, etc.), might provide options to use balances on previously purchased gift cards on new items, might provide options to receive cash back on balances on previously purchased gift cards, might provide incentives to pre-purchase gift cards (e.g., double cash back offers, points, discounts, etc.), and might use location information of user and known user locations to provide geo-relevant weighting to item searches and recommendations, etc. The computing system might display incentives for the user to use the service offered by the service provider, such incentives including, but not limited to, getting money or credit (e.g., $5 or the like) instantly if the user signs up and adds a payment method, getting money or credit (e.g., $10 or the like) if the user makes the first purchase with the gift card purchasing service offered by the service provider, getting money or credit (e.g., $20 or the like) if the user makes a purchase with the gift card purchasing service offered by the service provider via a mobile app and extension. The computing system might provide options to add payment methods associated with the user.

Figure 6E:
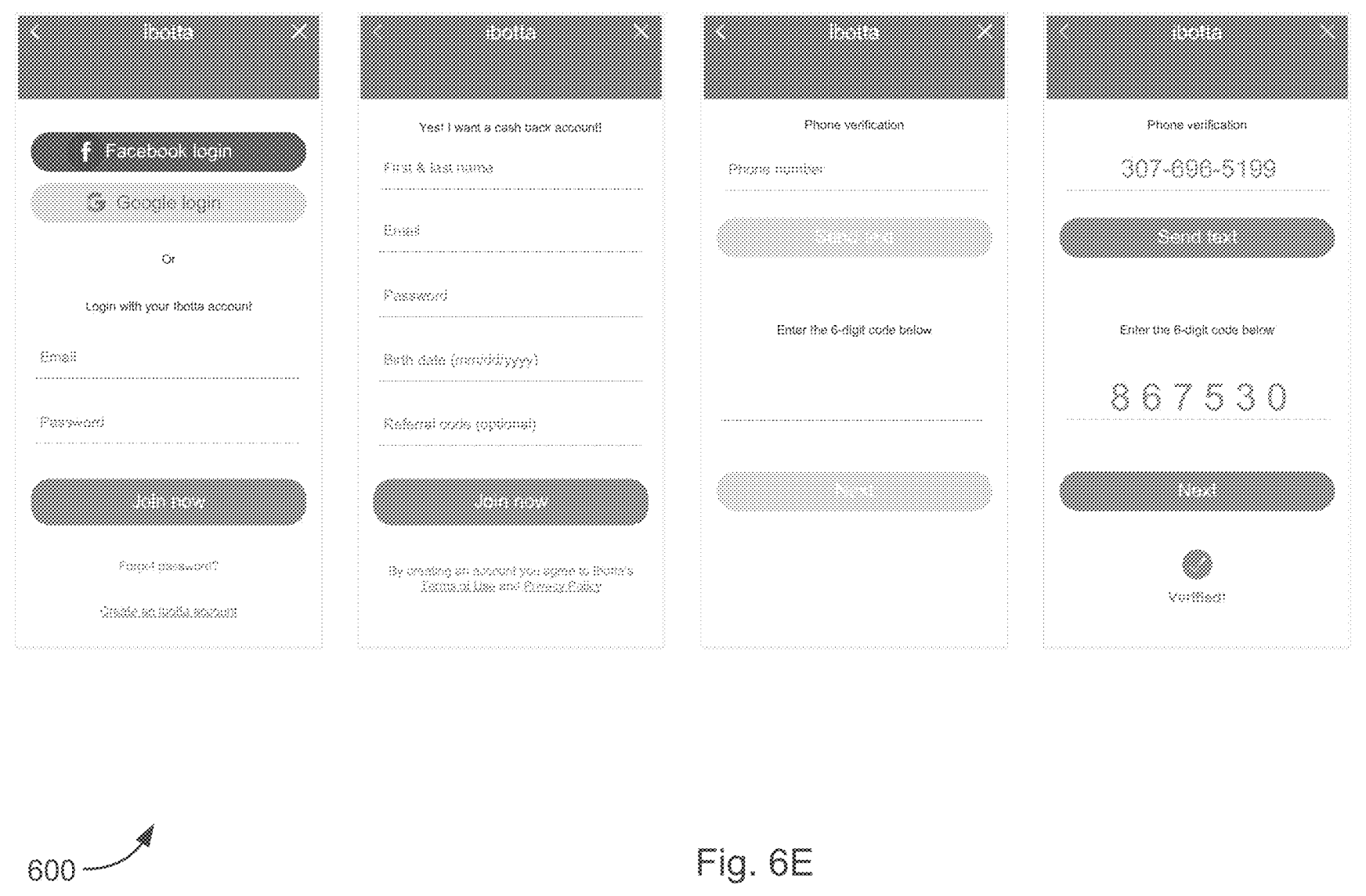

FIG. 6E might display options to login or create an account with the service provider, with phone verification, which would result in a text message with a code being sent to the user's phone in response to the user selecting to send text, where the user entering the code in the text message providing authentication or verification of the user's phone.

Figure 6F:
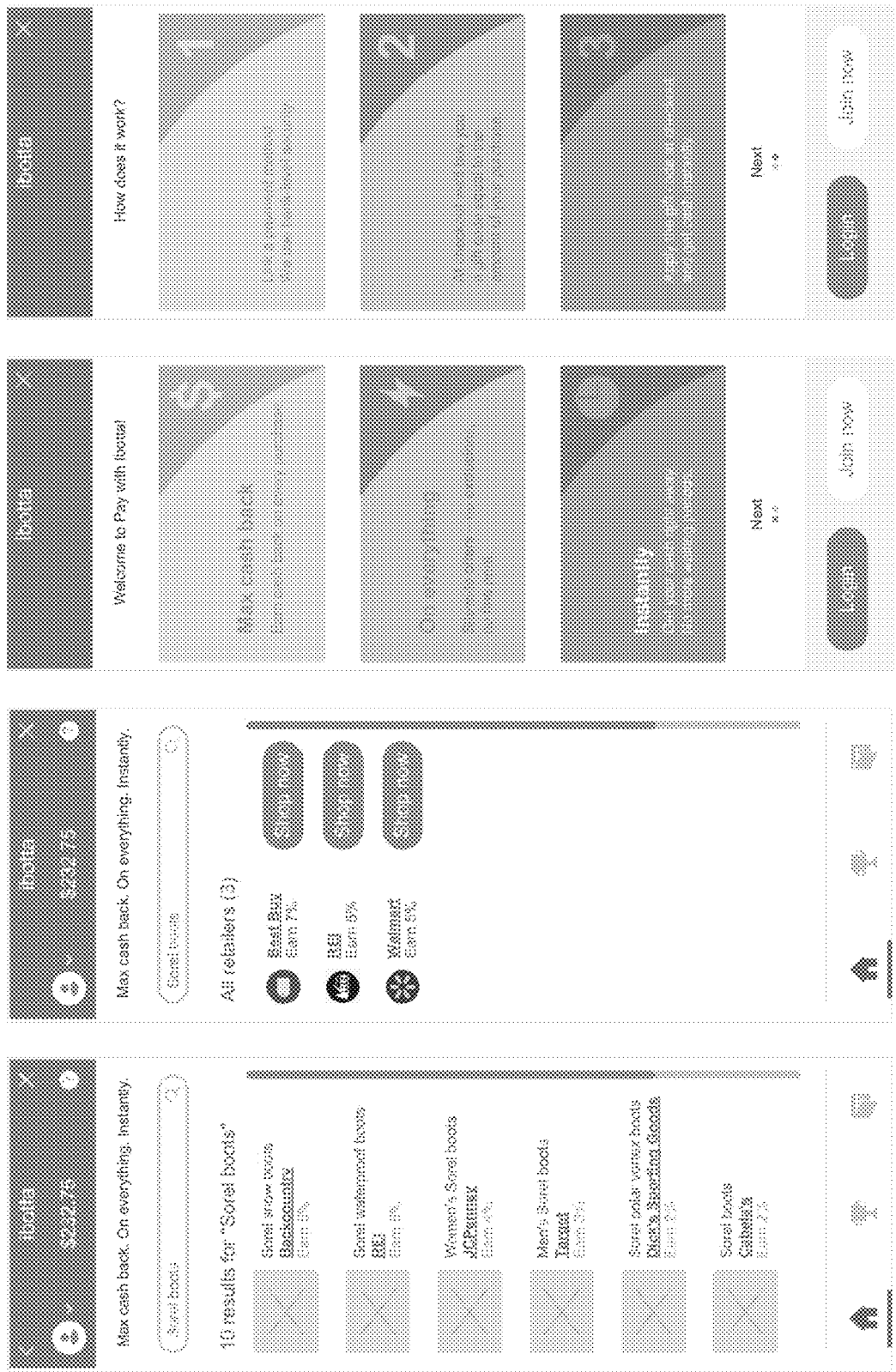

FIG. 6F might display options for the user to search for items or to search product categories, or the like, which might result in a list of search results for relevant items and retailers, in some cases displaying the percentage or amount of credit that the user can earn by purchasing the items from each retailer. FIG. 6F might also display a list of suggested retailers, which might include the percentage or amount of credit that the user can earn by shopping with the retailer and might include options to shop now at one or more of the listed retailers. FIG. 6F might display incentives for using the service offered by the service provider, including, but not limited to, earning (maximum) cash back on every purchase (by linking a payment method, with assurances that the service provider uses bank-level security, etc.) on everything sitewide (with no exclusions, and no fine print, etc.; which indicates that the system will allow the user to buy a gift code at checkout of a retailer that has a value equal to the amount of the user's purchase as indicated in the checkout of the retailer) instantly (which indicates that they user can receive cash back right away with no more waiting periods; i.e., where applying the gift code at checkout results in instant cash back for the user).

These and other features of gift card purchasing functionality described herein with respect to the figures are merely illustrative and are not limited to the expressly disclosed features, but may encompass any suitable embodiment or feature.

Exemplary System and Hardware Implementation

Figure 7:
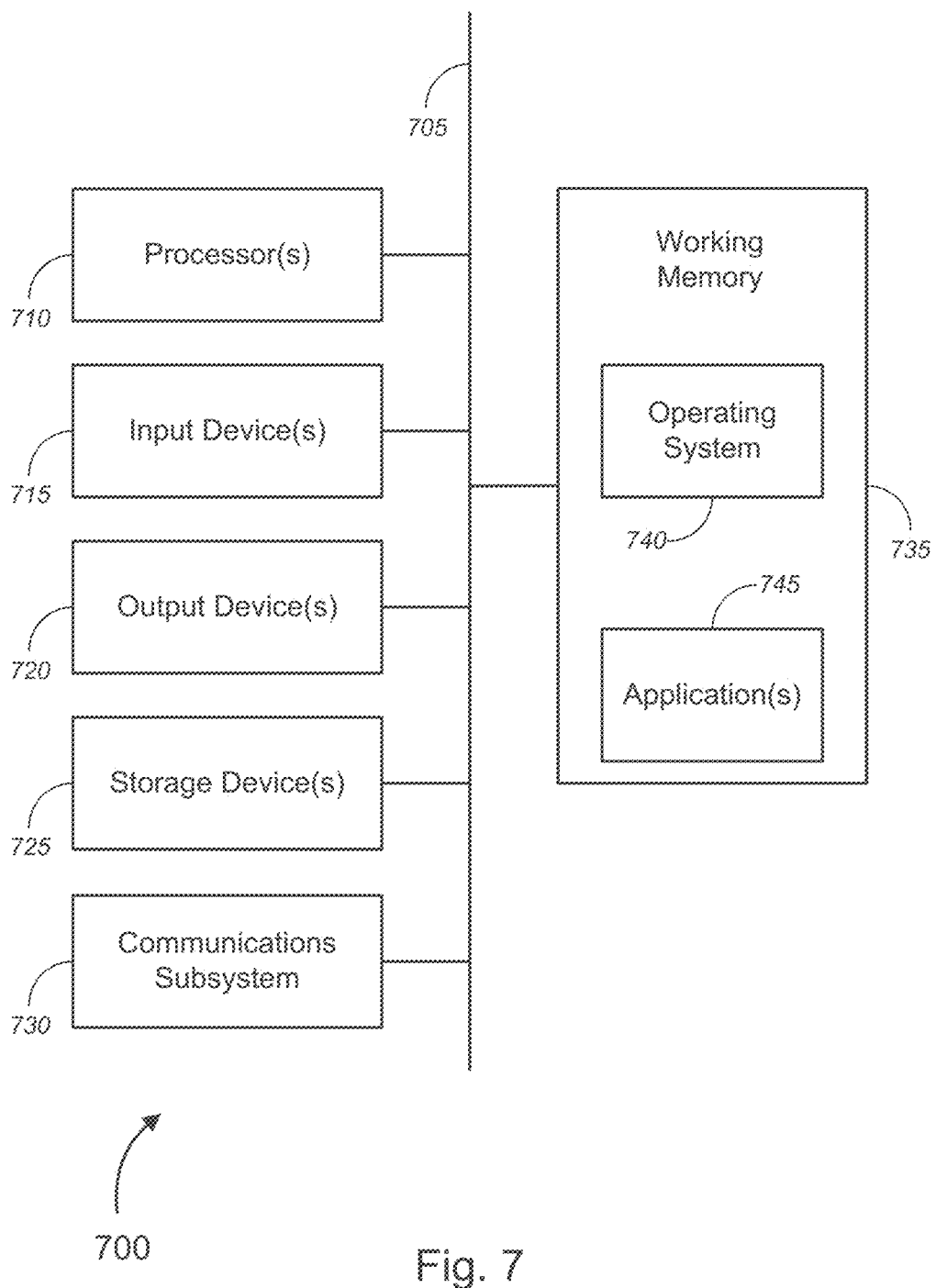
FIG. 7 is a block diagram illustrating an exemplary computer or system hardware architecture, in accordance with various embodiments.

FIG. 7 is a block diagram illustrating an exemplary computer or system hardware architecture, in accordance with various embodiments. FIG. 7 provides a schematic illustration of one embodiment of a computer system 700 of the service provider system hardware that can perform the methods provided by various other embodiments, as described herein, and/or can perform the functions of computer or hardware system (i.e., computing system 105, user devices 120, 205, and 305, retailer servers 145a-145n, and artificial intelligence ("AI") systems 160, etc.), as described above. It should be noted that FIG. 7 is meant only to provide a generalized illustration of various components, of which one or more (or none) of each may be utilized as appropriate. FIG. 7, therefore, broadly illustrates how individual system elements may be implemented in a relatively separated or relatively more integrated manner.

The computer or hardware system 700—which might represent an embodiment of the computer or hardware system (i.e., computing system 105, user devices 120, 205, and 305, retailer servers 145a-145n, and AI systems 160, etc.), described above with respect to FIGS. 1-6—is shown comprising hardware elements that can be electrically coupled via a bus 705 (or may otherwise be in communication, as appropriate). The hardware elements may include one or more processors 710, including, without limitation, one or more general-purpose processors and/or one or more special-purpose processors (such as microprocessors, digital signal processing chips, graphics acceleration processors, and/or the like); one or more input devices 715, which can include, without limitation, a mouse, a keyboard, and/or the like; and one or more output devices 720, which can include, without limitation, a display device, a printer, and/or the like.

The computer or hardware system 700 may further include (and/or be in communication with) one or more storage devices 725, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable, and/or the like. Such storage devices may be configured to implement any appropriate data stores, including, without limitation, various file systems, database structures, and/or the like.

The computer or hardware system 700 might also include a communications subsystem 730, which can include, without limitation, a modem, a network card (wireless or wired), an infra-red communication device, a wireless communication device and/or chipset (such as a Bluetooth™ device, an 802.11 device, a WiFi device, a WiMax device, a WWAN device, cellular communication facilities, etc.), and/or the like. The communications subsystem 730 may permit data to be exchanged with a network (such as the network described below, to name one example), with other computer or hardware systems, and/or with any other devices described herein. In many embodiments, the computer or hardware system 700 will further comprise a working memory 735, which can include a RAM or ROM device, as described above.

The computer or hardware system 700 also may comprise software elements, shown as being currently located within the working memory 735, including an operating system 740, device drivers, executable libraries, and/or other code, such as one or more application programs 745, which may comprise computer programs provided by various embodiments (including, without limitation, hypervisors, VMs, and the like), and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be encoded and/or stored on a non-transitory computer readable storage medium, such as the storage device(s) 725 described above. In some cases, the storage medium might be incorporated within a computer system, such as the system 700. In other embodiments, the storage medium might be separate from a computer system (i.e., a removable medium, such as a compact disc, etc.), and/or provided in an installation package, such that the storage medium can be used to program, configure, and/or adapt a general purpose computer with the instructions/code stored thereon. These instructions might take the form of executable code, which is executable by the computer or hardware system 700 and/or might take the form of source and/or installable code, which, upon compilation and/or installation on the computer or hardware system 700 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware (such as programmable logic controllers, field-programmable gate arrays, application-specific integrated circuits, and/or the like) might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer or hardware system (such as the computer or hardware system 700) to perform methods in accordance with various embodiments of the invention. According to a set of embodiments, some or all of the procedures of such methods are performed by the computer or hardware system 700 in response to processor 710 executing one or more sequences of one or more instructions (which might be incorporated into the operating system 740 and/or other code, such as an application program 745) contained in the working memory 735. Such instructions may be read into the working memory 735 from another computer readable medium, such as one or more of the storage device(s) 725. Merely by way of example, execution of the sequences of instructions contained in the working memory 735 might cause the processor(s) 710 to perform one or more procedures of the methods described herein.

The terms "machine readable medium" and "computer readable medium," as used herein, refer to any medium that participates in providing data that causes a machine to operate in a specific fashion. In an embodiment implemented using the computer or hardware system 700, various computer readable media might be involved in providing instructions/code to processor(s) 710 for execution and/or might be used to store and/or carry such instructions/code (e.g., as signals). In many implementations, a computer readable medium is a non-transitory, physical, and/or tangible storage medium. In some embodiments, a computer readable medium may take many forms, including, but not limited to, non-volatile media, volatile media, or the like. Non-volatile media includes, for example, optical and/or magnetic disks, such as the storage device(s) 725. Volatile media includes, without limitation, dynamic memory, such as the working memory 735. In some alternative embodiments, a computer readable medium may take the form of transmission media, which includes, without limitation, coaxial cables, copper wire, and fiber optics, including the wires that comprise the bus 705, as well as the various components of the communication subsystem 730 (and/or the media by which the communications subsystem 730 provides communication with other devices). In an alternative set of embodiments, transmission media can also take the form of waves (including without limitation radio, acoustic, and/or light waves, such as those generated during radio-wave and infra-red data communications).

Common forms of physical and/or tangible computer readable media include, for example, a floppy disk, a flexible disk, a hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 710 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer or hardware system 700. These signals, which might be in the form of electromagnetic signals, acoustic signals, optical signals, and/or the like, are all examples of carrier waves on which instructions can be encoded, in accordance with various embodiments of the invention.

The communications subsystem 730 (and/or components thereof) generally will receive the signals, and the bus 705 then might carry the signals (and/or the data, instructions, etc. carried by the signals) to the working memory 735, from which the processor(s) 705 retrieves and executes the instructions. The instructions received by the working memory 735 may optionally be stored on a storage device 725 either before or after execution by the processor(s) 710.

Figure 8:
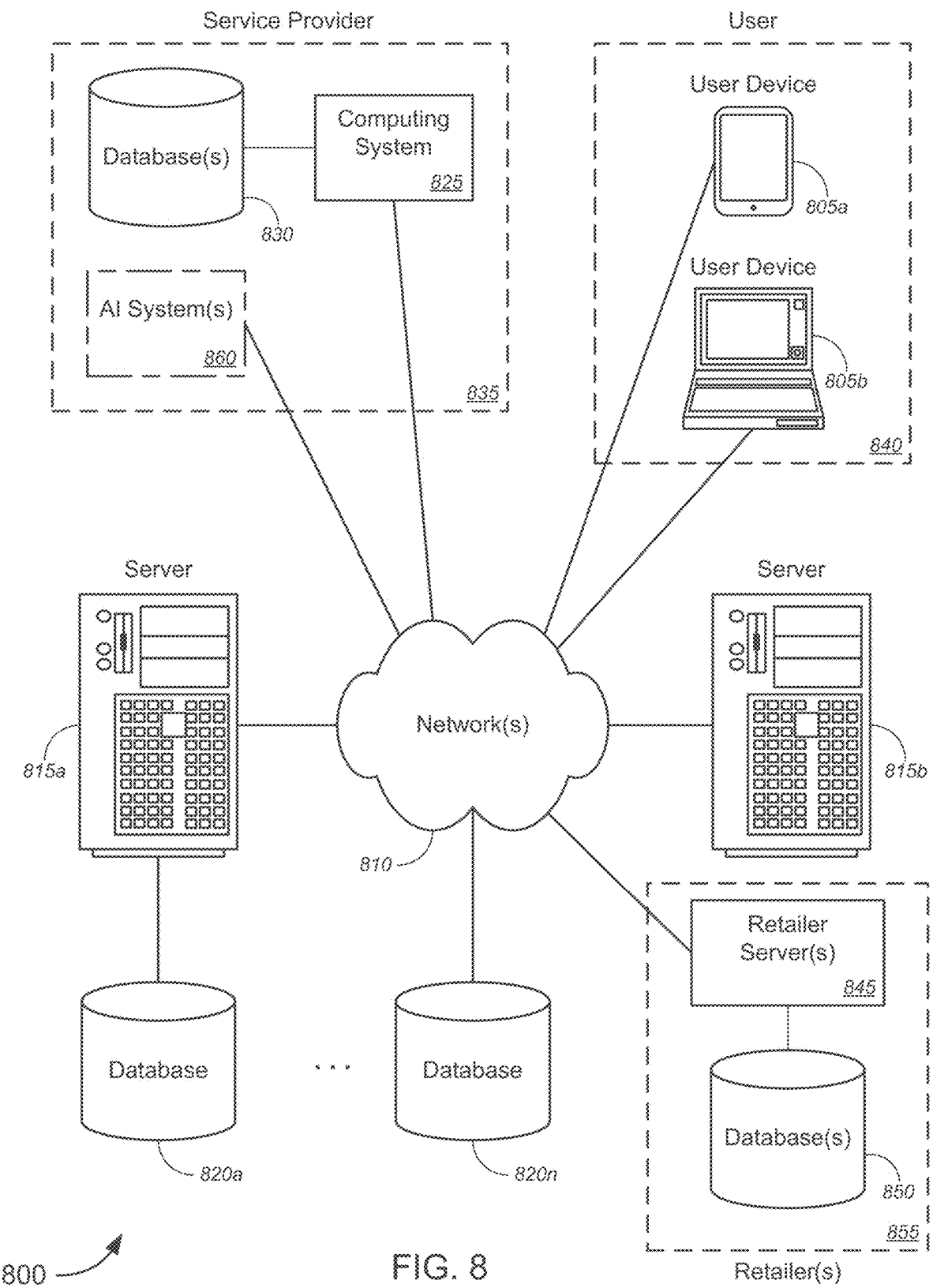
FIG. 8 is a block diagram illustrating a networked system of computers, computing systems, or system hardware architecture, which can be used in accordance with various embodiments.

As noted above, a set of embodiments comprises methods and systems for implementing online shopping functionalities, and, more particularly, to methods, systems, and apparatuses for implementing stored-value instrument purchase functionality (e.g., gift card purchase functionality, or the like) for online shopping systems. FIG. 8 illustrates a schematic diagram of a system 800 that can be used in accordance with one set of embodiments. The system 800 can include one or more user computers, user devices, or customer devices 805. A user computer, user device, or customer device 805 can be a general purpose personal computer (including, merely by way of example, desktop computers, tablet computers, laptop computers, handheld computers, and the like, running any appropriate operating system, several of which are available from vendors such as Apple, Microsoft Corp., and the like), cloud computing devices, a server(s), and/or a workstation computer(s) running any of a variety of commercially-available UNIX™ or UNIX-like operating systems. A user computer, user device, or customer device 805 can also have any of a variety of applications, including one or more applications configured to perform methods provided by various embodiments (as described above, for example), as well as one or more office applications, database client and/or server applications, and/or web browser applications. Alternatively, a user computer, user device, or customer device 805 can be any other electronic device, such as a thin-client computer, Internet-enabled mobile telephone, and/or personal digital assistant, capable of communicating via a network (e.g., the network(s) 810 described below) and/or of displaying and navigating web pages or other types of electronic documents. Although the exemplary system 800 is shown with two user computers, user devices, or customer devices 805, any number of user computers, user devices, or customer devices can be supported.

Certain embodiments operate in a networked environment, which can include a network(s) 810. The network(s) 810 can be any type of network familiar to those skilled in the art that can support data communications using any of a variety of commercially-available (and/or free or proprietary) protocols, including, without limitation, TCP/IP, SNA™, IPX™, AppleTalk™, and the like. Merely by way of example, the network(s) 810 (similar to network(s) 130 FIG. 1, or the like) can each include a local area network ("LAN"), including, without limitation, a fiber network, an Ethernet network, a Token-Ring™ network, and/or the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including, without limitation, a network operating under any of the IEEE 802.11 suite of protocols, the Bluetooth™ protocol known in the art, and/or any other wireless protocol; and/or any combination of these and/or other networks. In a particular embodiment, the network might include an access network of the service provider (e.g., an Internet service provider ("ISP")). In another embodiment, the network might include a core network of the service provider, and/or the Internet.

Embodiments can also include one or more server computers 815. Each of the server computers 815 may be configured with an operating system, including, without limitation, any of those discussed above, as well as any commercially (or freely) available server operating systems. Each of the servers 815 may also be running one or more applications, which can be configured to provide services to one or more clients 805 and/or other servers 815.

Merely by way of example, one of the servers 815 might be a data server, a web server, a cloud computing device(s), or the like, as described above. The data server might include (or be in communication with) a web server, which can be used, merely by way of example, to process requests for web pages or other electronic documents from user computers 805. The web server can also run a variety of server applications, including HTTP servers, FTP servers, CGI servers, database servers, Java servers, and the like. In some embodiments of the invention, the web server may be configured to serve web pages that can be operated within a web browser on one or more of the user computers 805 to perform methods of the invention.

The server computers 815, in some embodiments, might include one or more application servers, which can be configured with one or more applications accessible by a client running on one or more of the client computers 805 and/or other servers 815. Merely by way of example, the server(s) 815 can be one or more general purpose computers capable of executing programs or scripts in response to the user computers 805 and/or other servers 815, including, without limitation, web applications (which might, in some cases, be configured to perform methods provided by various embodiments). Merely by way of example, a web application can be implemented as one or more scripts or programs written in any suitable programming language, such as Java™, C, C#™ or C++, and/or any scripting language, such as Perl, Python, or TCL, as well as combinations of any programming and/or scripting languages. The application server(s) can also include database servers, including, without limitation, those commercially available from Oracle™, Microsoft™, Sybase™, IBM™, and the like, which can process requests from clients (including, depending on the configuration, dedicated database clients, API clients, web browsers, etc.) running on a user computer, user device, or customer device 805 and/or another server 815. In some embodiments, an application server can perform one or more of the processes for implementing online shopping functionalities, and, more particularly, to methods, systems, and apparatuses for implementing stored-value instrument purchase functionality (e.g., gift card purchase functionality, or the like) for online shopping systems, as described in detail above. Data provided by an application server may be formatted as one or more web pages (comprising HTML, JavaScript, etc., for example) and/or may be forwarded to a user computer 805 via a web server (as described above, for example). Similarly, a web server might receive web page requests and/or input data from a user computer 805 and/or forward the web page requests and/or input data to an application server. In some cases, a web server may be integrated with an application server.

In accordance with further embodiments, one or more servers 815 can function as a file server and/or can include one or more of the files (e.g., application code, data files, etc.) necessary to implement various disclosed methods, incorporated by an application running on a user computer 805 and/or another server 815. Alternatively, as those skilled in the art will appreciate, a file server can include all necessary files, allowing such an application to be invoked remotely by a user computer, user device, or customer device 805 and/or server 815.

It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 820a-820n (collectively, "databases 820"). The location of each of the databases 820 is discretionary: merely by way of example, a database 820a might reside on a storage medium local to (and/or resident in) a server 815a (and/or a user computer, user device, or customer device 805). Alternatively, a database 820n can be remote from any or all of the computers 805, 815, so long as it can be in communication (e.g., via the network 810) with one or more of these. In a particular set of embodiments, a database 820 can reside in a storage-area network ("SAN") familiar to those skilled in the art. (Likewise, any necessary files for performing the functions attributed to the computers 805, 815 can be stored locally on the respective computer and/or remotely, as appropriate.) In one set of embodiments, the database 820 can be a relational database, such as an Oracle database, that is adapted to store, update, and retrieve data in response to SQL-formatted commands. The database might be controlled and/or maintained by a database server, as described above, for example.

According to some embodiments, system 800 might further comprise a computing system 825 (similar to computing system 105 of FIG. 1, or the like) and corresponding database(s) 830 (similar to database(s) 110 of FIG. 1, or the like), which might be associated with service provider 835 (similar to service provider 115 of FIG. 1, or the like). System 800 might further comprise a user 840 (similar to user 125 of FIG. 1, or the like) who is associated with user devices 805a and/or 805b (similar to user device(s) 120 of FIG. 1, or the like), or the like. System 800 might also comprise one or more retailer servers 845 (similar to retailer servers 145a-145n of FIG. 1, or the like) and corresponding databases 850 (similar to databases 150a-150n of FIG. 1, or the like) associated with each of one or more retailers 855. System 800 might further comprise one or more artificial intelligence ("AI") or machine learning systems 860 (optional; similar to AI or machine learning system(s) 160 of FIG. 1, or the like).

In operation, the computing system 825 might assess at least one of content or information that is presented in at least one of a shopping cart page or a checkout page of a website associated with a retailer(s) (e.g., retailer(s) 855, or the like) that may be hosted on a server (e.g., retailer(s) server(s) 845, or the like), wherein the at least one of the shopping cart page or the checkout page lists items that a user has selected for purchase from the retailer(s) and lists a total amount due on the items being purchased (which might include a sum of amounts for each item, applicable taxes, and shipping and handling fees, or the like). The computing system 825 might autonomously modify the at least one of the shopping cart page or the checkout page of the website associated with the retailer(s) by generating a user-selectable option within the at least one of the shopping cart page or the checkout page, wherein the user-selectable option comprises an option for the user to purchase items in the at least one of the shopping cart page or the checkout page of the website associated with the retailer(s) using a gift card available for purchase from the service provider. In response to the user-selectable option being selected by the user, the computing system 825 might provide a purchase interface that presents the user with a process (or a series of steps) to purchase a gift card having a gift card value that covers the total amount due on the items being purchased. In response to the user completing purchase of the gift card, the computing system 825 might apply the gift card value toward the total amount due on the items being purchased within the at least one of the shopping cart page or the checkout page of the website associated with the retailer(s). Alternatively, the user might purchase a gift card having a gift card value that is less than the total amount due on the items being purchased within the at least one of the shopping cart page or the checkout page of the website associated with the first retailer. In such cases, in response to the user completing purchase of the gift card, the computing system might apply the gift card value toward the total amount due on the items being purchased within the at least one of the shopping cart page or the checkout page of the web site associated with the first retailer, with the computing system 825 presenting the user with payment options for payment of the remaining balance on the total amount due on the items being purchased within the at least one of the shopping cart page or the checkout page of the website associated with the first retailer. In some embodiments, the modification of the at least one of the shopping cart page or the checkout page of the web site (and/or any of the steps corresponding to assessing the at least one of content or information that is presented in the at least one of the shopping cart page or the checkout page, to providing the purchase interface, and/or to applying the gift card value toward the total amount) may be implemented using one of a browser plug-in, a custom browser, a mobile browser, or a software app, and/or the like, that are associated with the service provider 835.

According to some embodiments, autonomously modifying the at least one of the shopping cart page or the checkout page of the website associated with the retailer(s) by generating the user-selectable option within the at least one of the shopping cart page or the checkout page might comprise autonomously modifying, with the computing system, a user interface of a user device (e.g., user interface of user device 805a and/or 805b, or the like) displaying the at least one of the shopping cart page or the checkout page of the website associated with the retailer(s) by generating a user-selectable option within a portion of the at least one of the shopping cart page or the checkout page that is displayed in the user interface of the user device (e.g., user interface of user device 805a and/or 805b, or the like), wherein selection of the items for purchase might be performed by the user 840 using the user device 805a and/or 805b.

In some embodiments, the gift card might have a gift card value greater than the total amount due on the items being purchased. In such cases, a balance on the gift card after application of the gift card value to the total amount due on the items being purchased might be provided to the user 840 as "user rewards" (which might include, without limitation, at least one of cash back, loyalty points, credit, or discounts, and/or the like). In some cases, the service provider 835 might receive a commission as compensation for providing the service, where the commission might come from a combination of gift card sale commissions, affiliate marketing commissions, and/or promotional codes used, and/or the like. Cash back to the user, for example, might be funded by sharing, with the user, a portion of the overall commission revenue that the service provider receives. Alternatively, a balance on the gift card after application of the gift card value to the total amount due on the items being purchased might be provided as credit to the user 840 for future online purchases through the service provider 835. Merely by way of example, in some instances, the computing system 825 might provide incentives to the user 840 for purchasing, or paying for, the items listed in the at least one of the shopping cart page or the checkout page of the website associated with the retailer(s). Such incentives might include, without limitation, offers to provide double or triple cash back if the user selects to purchase the items using gift cards available for purchase from the service provider 835, offers to apply a discount (or a further discount) on the total amount due on the items being purchased if the user selects to purchase the items using gift cards available for purchase from the service provider 835, offers for further cash back on future purchases by purchasing the items using gift cards now or within a limited time period, or offers for future discounts on future purchases by purchasing the items using gift cards now or within a limited time period, and/or the like.

According to some embodiments, completion of the purchase of the gift card results in a gift card code being presented to the user, wherein applying the gift card value toward the total amount due on the items being purchased might comprise autonomously auto-filling, with the computing system, the gift card code within the at least one of the shopping cart page or the checkout page of the website associated with the retailer(s) to apply the gift card value toward the total amount due on the items being purchased. Alternatively, completion of the purchase of the gift card results in a gift card code being presented to the user and a notification being presented to the user, wherein applying the gift card value toward the total amount due on the items being purchased might comprise presenting the notification to the user, the notification including instructions on how the user can manually enter (or copy and paste) the gift card code within the at least one of the shopping cart page or the checkout page of the website associated with the retailer(s) to apply the gift card value toward the total amount due on the items being purchased. Alternative to auto-filling the gift card code or having the user copy and paste (or manually enter) the gift card code, the computing system might copy the gift card code to the system clipboard and might provide a notification to the user regarding how and where to paste the gift card code (in particular, where the auto-fill functionality is disabled or unsupported, for example).

Merely by way of example, in some cases, assessing the at least one of content or information that is presented in the at least one of the shopping cart page or the checkout page of the website associated with the retailer(s) might comprise assessing the at least one of content or information that is presented in the at least one of the shopping cart page or the checkout page of the website associated with the retailer(s) using AI or machine learning system(s) 860.

These and other functions of the system 800 (and its components) are described in greater detail above with respect to FIGS. 1-6.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A method, comprising:

assessing, with a computing system and using at least one artificial intelligence ("AI") system or at least one machine learning system, at least one of content or information that is presented in at least one of a shopping cart page or a checkout page of a website associated with a first retailer, wherein the at least one of the shopping cart page or the checkout page lists items that a user has selected for purchase from the first retailer and lists a total amount due on the items being purchased, wherein the computing system is associated with a service provider that is separate from, and unaffiliated with, the first retailer, wherein the website is unaffiliated with the service provider associated with the computing system;

autonomously modifying, with the computing system, the at least one of the shopping cart page or the checkout page of the website that is associated with the first retailer but is unaffiliated with the service provider associated with the computing system, by generating a user-selectable option within the at least one of the shopping cart page or the checkout page, wherein the user-selectable option comprises an option for the user to purchase items in the at least one of the shopping cart page or the checkout page of the website associated with the first retailer using a gift card available for purchase from the service provider;

in response to the user-selectable option being selected by the user, providing, with the computing system, a purchase interface that presents the user with a process to purchase a gift card having a gift card value; and in response to the user completing purchase of the gift card, applying, with the computing system, the gift card value toward the total amount due on the items being purchased within the at least one of the shopping cart page or the checkout page of the website associated with the first retailer.

2. The method of claim 1, wherein the computing system comprises a processor of the user device running a software application ("app"), a server computer over a network, a cloud-based computing system over a network, or a distributed computing system.

3. The method of claim 1, wherein the modification of the at least one of the shopping cart page or the checkout page of the website is implemented using one of a browser plug-in, a custom browser, a mobile browser, or a software app associated with the service provider.

4. The method of claim 1, wherein autonomously modifying the at least one of the shopping cart page or the checkout page of the website associated with the first retailer by generating the user-selectable option within the at least one of the shopping cart page or the checkout page comprises autonomously modifying, with the computing system, a user interface of a user device displaying the at least one of the shopping cart page or the checkout page of the website associated with the first retailer by generating a user-selectable option within a portion of the at least one of the shopping cart page or the checkout page that is displayed in the user interface of the user device, wherein selection of the items for purchase is performed by the user using the user device.

5. The method of claim 4, wherein the user device comprises one of a tablet computer, a laptop computer, a desktop computer, a smart phone, a mobile phone, a gaming console, a portable gaming device, or a wearable device.

6. The method of claim 1, wherein the total amount due on the items being purchased comprises a sum of amounts for each item, applicable taxes, and shipping and handling fees.

7. The method of claim 1, wherein the gift card has a gift card value greater than the total amount due on the items being purchased, wherein a balance on the gift card after application of the gift card value to the total amount due on the items being purchased is provided to the user as user rewards.

8. The method of claim 1, wherein the gift card has a gift card value greater than the total amount due on the items being purchased, wherein a balance on the gift card after application of the gift card value to the total amount due on the items being purchased is provided as credit to the user for future online purchases through the service provider.

9. The method of claim 1, wherein completion of the purchase of the gift card results in a gift card code being presented to the user, wherein applying the gift card value toward the total amount due on the items being purchased comprises autonomously auto-filling, with the computing system, the gift card code within the at least one of the shopping cart page or the checkout page of the website associated with the first retailer to apply the gift card value toward the total amount due on the items being purchased.

10. The method of claim 1, wherein completion of the purchase of the gift card results in a gift card code being presented to the user and a notification being presented to the user, the notification including instructions on how the user can manually enter the gift card code within the at least one of the shopping cart page or the checkout page of the website associated with the first retailer to apply the gift card value toward the total amount due on the items being purchased.

11. An apparatus, comprising:
at least one processor; and
a non-transitory computer readable medium communicatively coupled to the at least one processor, the non-transitory computer readable medium having stored thereon computer software comprising a set of instructions that, when executed by the at least one processor, causes the apparatus to:
assess, using at least one artificial intelligence ("AI") system or at least one machine learning system, at least one of content or information that is presented in a checkout page of at least one of a shopping cart page or a website associated with a first retailer, wherein the at least one of the shopping cart page or the checkout page lists items that a user has selected for purchase from the first retailer and lists a total amount due on the items being purchased, wherein the apparatus is associated with a service provider that is separate from, and unaffiliated with, the first retailer, wherein the website is unaffiliated with the service provider associated with the computing system;
autonomously modify the at least one of the shopping cart page or the checkout page of the website that is associated with the first retailer but is unaffiliated with the service provider associated with the computing system, by generating a user-selectable option within the at least one of the shopping cart page or the checkout page, wherein the user-selectable option comprises an option for the user to purchase items in the at least one of the shopping cart page or the checkout page of the website associated with the first retailer using a gift card available for purchase from the service provider;
in response to the user-selectable option being selected by the user, provide a purchase interface that presents the user with a process to purchase a gift card having a gift card value; and
in response to the user completing purchase of the gift card, apply the gift card value toward the total amount due on the items being purchased within the at least one of the shopping cart page or the checkout page of the website associated with the first retailer.

12. The apparatus of claim 11, wherein the apparatus comprises a processor of the user device running a software application ("app"), a server computer over a network, a cloud-based computing system over a network, or a distributed computing system.

13. The apparatus of claim 11, wherein the modification of the at least one of the shopping cart page or the checkout page of the website is implemented using one of a browser plug-in, a custom browser, a mobile browser, or a software app associated with the service provider.

14. The apparatus of claim 11, wherein autonomously modifying the at least one of the shopping cart page or the checkout page of the website associated with the first retailer by generating the user-selectable option within the at least one of the shopping cart page or the checkout page comprises autonomously modifying a user interface of a user device displaying the at least one of the shopping cart page or the checkout page of the website associated with the first retailer by generating a user-selectable option within a portion of the at least one of the shopping cart page or the checkout page that is displayed in the user interface of the user device, wherein selection of the items for purchase is performed by the user using the user device.

15. The apparatus of claim 14, wherein the user device comprises one of a tablet computer, a laptop computer, a desktop computer, a smart phone, a mobile phone, a gaming console, a portable gaming device, or a wearable device.

16. The apparatus of claim 11, wherein completion of the purchase of the gift card results in a gift card code being presented to the user, wherein applying the gift card value toward the total amount due on the items being purchased comprises autonomously auto-filling the gift card code within the at least one of the shopping cart page or the checkout page of the website associated with the first retailer to apply the gift card value toward the total amount due on the items being purchased.

17. The apparatus of claim 11, wherein completion of the purchase of the gift card results in a gift card code being presented to the user and a notification being presented to the user, the notification including instructions on how the user can manually enter the gift card code within the at least one of the shopping cart page or the checkout page of the website associated with the first retailer to apply the gift card value toward the total amount due on the items being purchased.

18. A system, comprising:
   a computing system, comprising:
      at least one first processor; and
      a first non-transitory computer readable medium communicatively coupled to the at least one first processor, the first non-transitory computer readable medium having stored thereon computer software comprising a first set of instructions that, when executed by the at least one first processor, causes the computing system to:
         assess, using at least one artificial intelligence ("AI") system or at least one machine learning system, at least one of content or information that is presented in at least one of a shopping cart page or a checkout page of a website associated with a first retailer, wherein the at least one of the shopping cart page or the checkout page lists items that a user has selected for purchase from the first retailer and lists a total amount due on the items being purchased, wherein the computing system is associated with a service provider that is separate from, and unaffiliated with, the first retailer, wherein the website is unaffiliated with the service provider associated with the computing system;
         autonomously modify the at least one of the shopping cart page or the checkout page of the website that is associated with the first retailer but is unaffiliated with the service provider associated with the computing system, by generating a user-selectable option within the at least one of the shopping cart page or the checkout page, wherein the user-selectable option comprises an option for the user to purchase items in the at least one of the shopping cart page or the checkout page of the website associated with the first retailer using a gift card available for purchase from the service provider;
         in response to the user-selectable option being selected by the user, provide a purchase interface that presents the user with a process to purchase a gift card having a gift card value; and
         in response to the user completing purchase of the gift card, apply the gift card value toward the total amount due on the items being purchased within the at least one of the shopping cart page or the checkout page of the website associated with the first retailer.

* * * * *